US012578004B2

(12) United States Patent
Ishii et al.

(10) Patent No.: US 12,578,004 B2
(45) Date of Patent: Mar. 17, 2026

(54) SHOCK ABSORBER

(71) Applicant: Hitachi Astemo, Ltd., Hitachinaka (JP)

(72) Inventors: Hirohito Ishii, Hitachinaka (JP); Takao Nakadate, Hitachinaka (JP); Osamu Yuno, Hitachinaka (JP); Yuta Yamaguchi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 511 days.

(21) Appl. No.: 18/023,174

(22) PCT Filed: Sep. 13, 2021

(86) PCT No.: PCT/JP2021/033574
§ 371 (c)(1),
(2) Date: Feb. 24, 2023

(87) PCT Pub. No.: WO2022/075011
PCT Pub. Date: Apr. 14, 2022

(65) Prior Publication Data
US 2023/0296158 A1      Sep. 21, 2023

(30) Foreign Application Priority Data
Oct. 8, 2020      (JP) ................................. 2020-170518

(51) Int. Cl.
　*F16F 9/516*　　　(2006.01)
　*F16F 9/19*　　　(2006.01)
　*F16F 9/348*　　　(2006.01)
(52) U.S. Cl.
　CPC ................ F16F 9/516 (2013.01); F16F 9/19 (2013.01); F16F 9/348 (2013.01);
(Continued)

(58) Field of Classification Search
　CPC .... F16F 9/348–3488; F16F 9/516; F16F 9/19; F16F 2222/12–126; F16F 2228/066; F16F 2232/08; F16F 2234/02
　See application file for complete search history.

(56) References Cited

U.S. PATENT DOCUMENTS

| | | | | |
|---|---|---|---|---|
| 2005/0263363 A1* | 12/2005 | Katou | ................... | F16F 9/3485 |
| | | | | 188/322.22 |
| 2011/0186393 A1 | 8/2011 | Maeda et al. | | |

(Continued)

FOREIGN PATENT DOCUMENTS

| | | |
|---|---|---|
| JP | 2008-89037 | 4/2008 |
| JP | 2011-158019 | 8/2011 |

(Continued)

OTHER PUBLICATIONS

International Search Report issued Oct. 12, 2021 in corresponding International Application No. PCT/JP2021/033574, with English language translation.

(Continued)

*Primary Examiner* — David R Morris
(74) *Attorney, Agent, or Firm* — Wenderoth, Lind & Ponack, L.L.P.

(57)　　　　　ABSTRACT

A shock absorber is configured in such a manner that a flow passage area of each of first orifices 169 and 189 is smallest throughout a communication passage that establishes communication between a chamber 2A or 2B on an upstream side and a chamber 2B or 2A on a downstream side, and therefore prevents a pressure in a back-pressure chamber 55 or 26 from excessively increasing. As a result, the shock absorber can prevent overshoot of a damping force due to a delay of valve opening of a main valve 53 or 23 due to a remaining pressure in the back-pressure chamber 55 or 26

(Continued)

when a movement of a piston 3 is switched from one direction to an opposite direction.

6 Claims, 14 Drawing Sheets

(52) U.S. Cl.
CPC ..... *F16F 2222/12* (2013.01); *F16F 2228/066* (2013.01); *F16F 2232/08* (2013.01); *F16F 2234/02* (2013.01)

(56) References Cited

U.S. PATENT DOCUMENTS

| | | |
|---|---|---|
| 2018/0216690 A1 | 8/2018 | Yamashita |
| 2022/0099153 A1* | 3/2022 | Yuno ....................... F16F 9/348 |

FOREIGN PATENT DOCUMENTS

| | | |
|---|---|---|
| JP | 2012-229716 | 11/2012 |
| WO | 2017/047661 | 3/2017 |

OTHER PUBLICATIONS

International Preliminary Report on Patentability issued Mar. 28, 2023 in corresponding International Application No. PCT/JP2021/033574, with English language translation.

* cited by examiner

SHOCK ABSORBER

TECHNICAL FIELD

The present invention relates to a damping force adjustable shock absorber that adjusts a damping force by controlling a flow of hydraulic fluid with respect to a stroke of a piston rod.

BACKGROUND ART

PTL 1 discloses a damping force adjustable hydraulic shock absorber configured to deliver hydraulic fluid from a chamber on an upstream side into a back-pressure chamber via a back-pressure delivery passage to prevent a main valve of the chamber on the upstream side from being opened when a piston moves in one direction (hereinafter referred to as a "conventional shock absorber"). This back-pressure delivery passage is formed by processing, on a valve member (a pilot case), a run-through hole axially extending through this valve member.

CITATION LIST

Patent Literature

PTL 1: Japanese Patent Application Public Disclosure No. 2008-89037

SUMMARY OF INVENTION

Technical Problem

According to the conventional shock absorber, if the pressure in the back-pressure chamber excessively increases due to the hydraulic fluid delivered from the back-pressure delivery passage, this may lead to a delay in valve opening of the main valve due to the remaining pressure in the back-pressure chamber and thus cause overshoot of the damping force when the piston is switched to a movement in the opposite direction. Now, the overshoot of the damping force can be prevented by reducing the flow passage area of the back-pressure delivery passage, i.e., reducing the hole diameter of the run-through hole (for example, "0.6 mm"). However, it is difficult to process such a small-diameter run-through hole on the valve member (the pilot case).

One of the objects of the present invention is to provide a shock absorber capable of preventing overshoot of a damping force.

Solution to Problem

According to one aspect of the present invention, a shock absorber includes a cylinder sealingly containing hydraulic fluid therein, a piston slidably inserted in the cylinder and partitioning an inside of the cylinder into two chambers, a piston rod coupled with the piston and extending out of the cylinder, a passage in which a flow of the hydraulic fluid is generated due to a movement of the piston rod in one direction, a main valve configured to apply a resistance force to a flow of the hydraulic fluid in the passage that is directed from a chamber on an upstream side to a chamber on a downstream side, a back-pressure chamber configured to apply an inner pressure in a valve-closing direction of the main valve, a bottomed cylindrical case member including a tubular portion having an opening portion on one end thereof and a bottom portion with the main valve disposed on the opening portion and the back-pressure chamber formed inside the case member, an upstream-side back-pressure delivery passage configured to deliver the hydraulic fluid from the chamber on the upstream side into the back-pressure chamber, a sub valve configured to be opened under a pressure in the back-pressure chamber and apply a resistance force to a flow of the hydraulic fluid from the back-pressure chamber to the chamber on the downstream side, a downstream-side back-pressure delivery passage formed in the case member and configured in such a manner that a flow of the hydraulic fluid is generated from a chamber switched to the upstream side according to a movement of the piston in an opposite direction to the back-pressure chamber, a seat portion formed on an inner side of the bottom portion of the case member and defining a pressure-receiving chamber in communication with the downstream-side back-pressure delivery passage, a check valve configured to be seated on the seat portion and permit a flow of the hydraulic fluid from the downstream-side back-pressure delivery passage to the back-pressure chamber, a first orifice provided in a communication passage that establishes communication between the chamber on the downstream side and the back-pressure chamber and having a smallest flow passage area in the communication passage, and a second orifice provided in the upstream-side back-pressure delivery passage and having a flow passage area larger than the first orifice.

Further, according to another aspect of the present invention, a shock absorber includes a cylinder sealingly containing hydraulic fluid therein, a piston slidably inserted in the cylinder and partitioning an inside of the cylinder into two chambers, a piston rod coupled with the piston and extending out of the cylinder, a passage in which a flow of the hydraulic fluid is generated due to a movement of the piston rod in one direction, a main valve configured to apply a resistance force to a flow of the hydraulic fluid in the passage that is directed from a chamber on an upstream side to a chamber on a downstream side, a back-pressure chamber configured to apply an inner pressure in a valve-closing direction of the main valve, a bottomed cylindrical case member including a tubular portion having an opening portion on one end thereof and a bottom portion with the main valve disposed on the opening portion and the back-pressure chamber formed inside the case member, a first seat portion formed on the bottom portion of the case member and defining a first pressure-receiving chamber in communication with the back-pressure chamber, a downstream-side back-pressure delivery passage formed in the bottom portion of the case member, configured in such a manner that the hydraulic fluid is delivered from a chamber switched to the upstream side according to a movement of the piston in an opposite direction to the back-pressure chamber, and isolated from the first pressure-receiving chamber, a second seat portion formed on the bottom portion of the case member and surrounding an opening of the downstream-side back-pressure delivery passage, a sub valve configured to be seated on the first seat portion and the second seat portion and configured to be opened under a pressure in the back-pressure chamber and apply a resistance force to a flow of the hydraulic fluid from the back-pressure chamber to the chamber on the downstream side, a first orifice formed on the second seat portion, and a second orifice provided in a communication passage that establishes communication between the back-pressure chamber and a chamber switched to the downstream side according to the movement of the piston in the opposite direction and having a flow passage area larger than the first orifice.

Advantageous Effects of Invention

According to the present invention, the overshoot of the damping force of the shock absorber can be prevented.

DESCRIPTION OF EMBODIMENTS (First Embodiment) A first embodiment of the present invention will be described with reference to the attached drawings.

Figure 1:
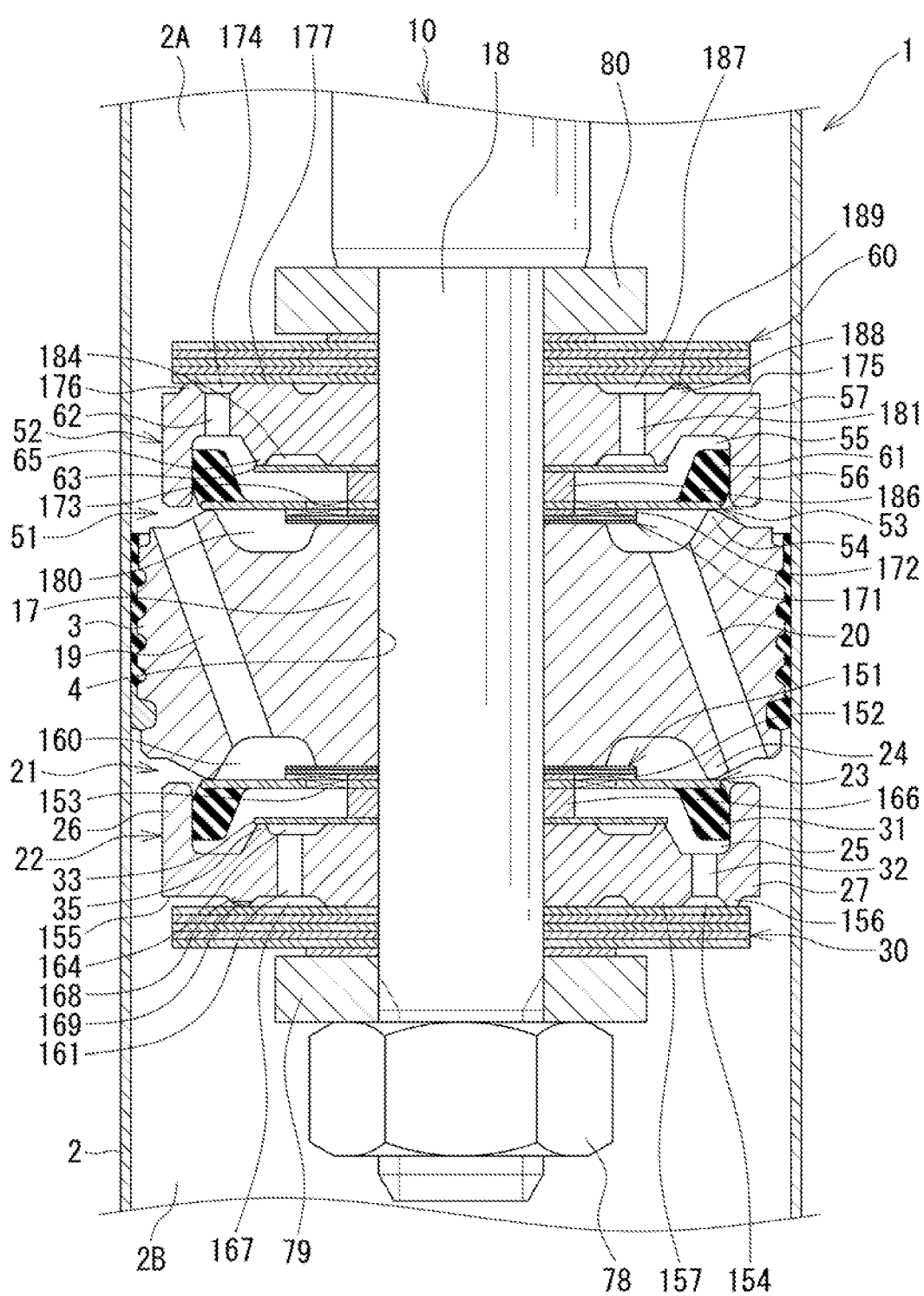
FIG. 1 is a cross-sectional view of a shock absorber according to a first embodiment taken along an axial plane.

For convenience, the vertical direction in FIG. 1 will be referred to as a "vertical direction" herein simply. The first embodiment will be described citing a single tube-type damping force adjustable shock absorber in the following description, but can also be applied to a twin tube-type damping force adjustable shock absorber including a reservoir.

As illustrated in FIG. 1, a shock absorber 1 is a damping force adjustable shock absorber including a damping force adjustment mechanism built in a cylinder 2. A piston 3 is slidably fittedly inserted in the cylinder 2. The piston 3 partitions the inside of the cylinder 2 into two chambers, a cylinder upper chamber 2A and a cylinder lower chamber 28. A free piston (not illustrated) vertically movable in the cylinder 2 is provided in the cylinder 2, and this free piston partitions the inside of the cylinder 2 into the cylinder lower chamber 2B on the piston 3 side (the upper side) and a gas chamber (not illustrated) on the bottom side (the lower side).

A small-diameter portion 18 formed at the lower end portion of a piston rod 10 is inserted through an axial hole 4 of the piston 3. The upper end side of the piston rod 10 extends out of the cylinder 2. An extension-side passage 19 and a compression-side passage 20 are provided in the piston 3. The upper end of the extension-side passage 19 is opened to the cylinder upper chamber 2A. The lower end of the compression-side passage 20 is opened to the cylinder lower chamber 2B. An extension-side valve mechanism 21 is provided on the lower end side of the piston 3. The extension-side valve mechanism 21 controls a flow of hydraulic fluid in the extension-side passage 19. A compression-side valve mechanism 51 is provided on the upper end side of the piston 3. The compression-side valve mechanism 51 controls a flow of hydraulic fluid in the compression-side passage 20.

The extension-side valve mechanism 21 includes a bottomed cylindrical extension-side pilot case 22 (a case member) attached to the small-diameter portion 18 of the piston rod 10. The extension-side pilot case 22 includes a cylindrical portion 26 (a tubular portion) and a bottom portion 27. The cylindrical portion 26 includes an opening portion 28 (refer to FIG. 3) on the piston 3 side (one side). An extension-side main valve 23 is disposed on the opening portion 28. The extension-side valve mechanism 21 includes a seat portion 24 and an extension-side back-pressure chamber 25. The seat portion 24 is formed on the outer peripheral side of the lower end surface of the piston 3, and the extension-side main valve 23 is in abutment with the seat portion 24 so as to be able to be separably seated thereon. The extension-side back-pressure chamber 25 is formed between the extension-side pilot case 22 and the back surface of the extension-side main valve 23. A pressure in the extension-side back-pressure chamber 25 is applied to the extension-side main valve 23 in a valve-closing direction. The extension-side main valve 23 is a packing valve in which an annular packing 31 made of an elastic member is in contact with the inner peripheral surface (the tubular portion) of the extension-side pilot case 22 along the entire circumference thereof.

The hydraulic fluid is delivered from the cylinder upper chamber 2A (a chamber on an upstream side) into the extension-side back-pressure chamber 25 via an extension-side back-pressure delivery passage (an upstream-side back-pressure delivery passage), i.e., the extension-side passage 19, an annular extension-side main pressure-receiving chamber 160 defined by the seat portion 24, an orifice 152 provided on a retainer 151, and an orifice 153 (a second orifice) provided on the extension-side main valve 23. The retainer 151 is provided between the piston 3 and the extension-side main valve 23. The extension-side back-pressure chamber 25 is in communication with the cylinder lower chamber 2B via a passage 32 formed on the bottom portion 27 of the extension-side pilot case 22 and a sub valve 30. The sub valve 30 is opened when the pressure in the extension-side back-pressure chamber 25 reaches a predetermined pressure, and applies a resistance force to a flow of the hydraulic fluid directed from the extension-side back-pressure chamber 25 to the cylinder lower chamber 2B (a chamber on a downstream side).

Figure 2:
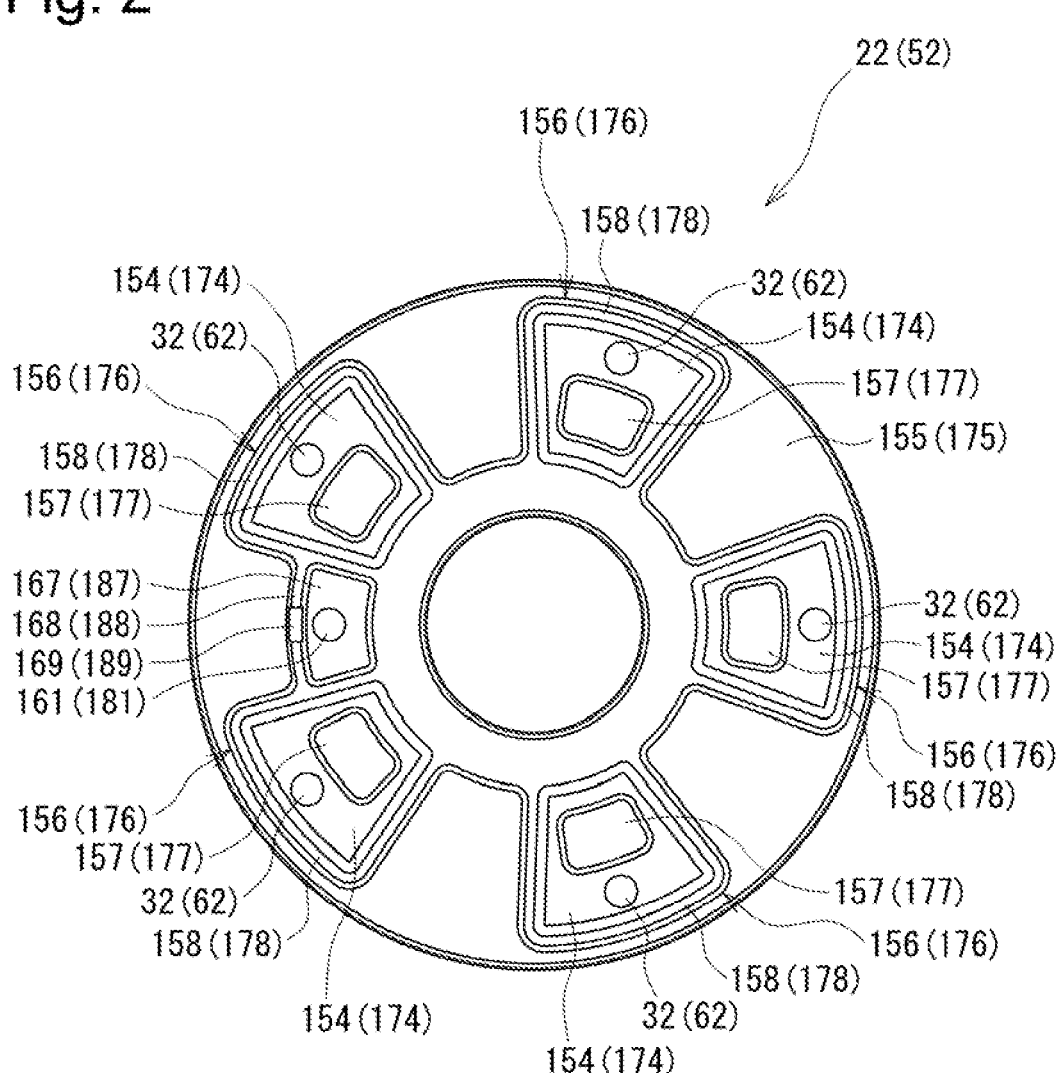
FIG. 2 is a front view of a pilot case according to the first embodiment.

The extension-side back-pressure chamber 25 is in communication with a first pressure-receiving chamber 154 formed between the extension-side pilot case 22 and the sub valve 30 via the passage 32. As illustrated in FIG. 2, the first pressure-receiving chamber 154 is defined in a circle sector-like form by an endless first seat portion 156 provided on a lower end surface 155 of the extension-side pilot case 22 (a surface opposite from the extension-side main valve 23 side). A seat portion 157 is provided on the inner side the first seat portion 156. The sub valve 30 is seated on the seat portion 157. The passage 32 is opened to a portion of the lower end surface 155 between the seat portion 157 and a circular arc-shaped outer peripheral portion 158 of the first seat portion 156. A plurality of first pressure-receiving chambers 154 ("five" chambers 154 in the first embodiment) is provided on the lower end surface 155 of the extension-side pilot case 22 at even intervals circumferentially.

As illustrated in FIG. 1, a back-pressure delivery passage 161 (a downstream-side back-pressure delivery passage) is provided in the extension-side pilot case 22. In the back-pressure delivery passage 161, a flow of the hydraulic fluid from the cylinder lower chamber 23 (a chamber switched to the upstream side) to the extension-side back-pressure chamber 25 is generated due to a movement of the piston 3 in a compression direction (an opposite direction). An annular seat portion 35 is provided on an upper end surface 162 of the extension-side pilot case 22 (a surface on the extension-side main valve 23 side, refer to FIG. 3). The seat portion 35 defines an annular pressure-receiving chamber 164 provided on the outer periphery of the inner peripheral portion of the bottom portion 27. The seat portion 35 is located at the same axial height (the "vertical height" in FIG. 3) as the upper end surface of the inner peripheral portion of the bottom portion 27.

A disk-like check valve 33 is in abutment with the seat portion 35 so as to be able to be separably seated thereon. The check valve 33 permits a flow of the hydraulic fluid from the back-pressure delivery passage 161 to the extension-side back-pressure chamber 25. The inner peripheral portion of the check valve 33, a spacer 166, the inner peripheral portion of the extension-side main valve 23, and the retainer 151 are interposed between the inner peripheral portion of the bottom portion 27 of the extension-side pilot case 22 and an inner peripheral portion 17 of the piston 3 in this order from the extension-side pilot case 22 side to the piston 3 side.

Figure 3:
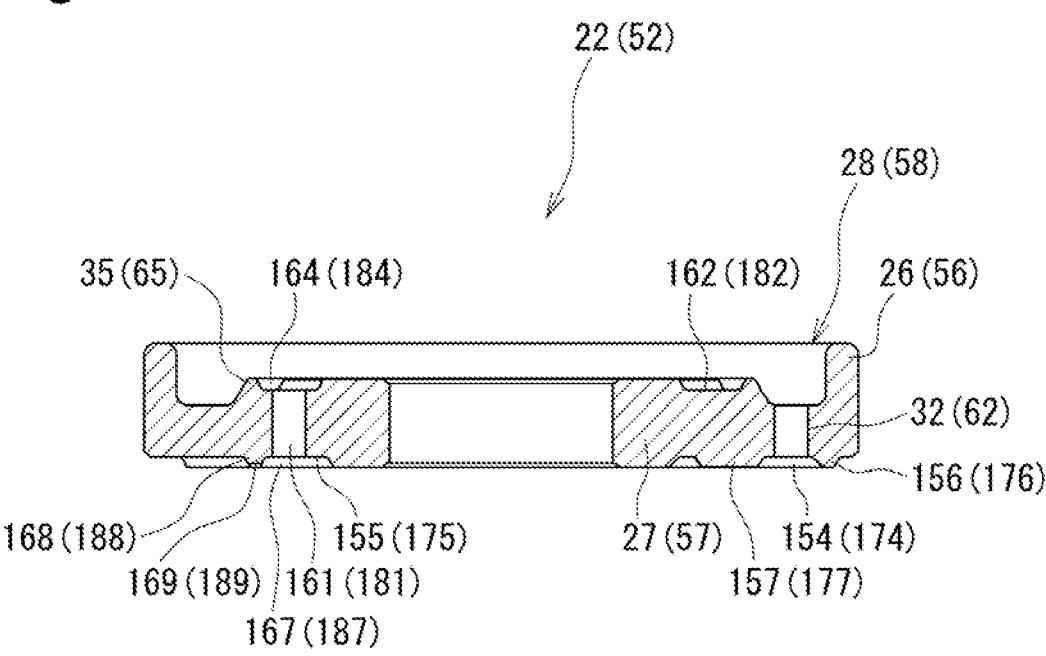
FIG. 3 is a cross-sectional view of the pilot case according to the first embodiment taken along the axial plane.

Referring to FIGS. 1 to 3, a second pressure-receiving chamber 167 isolated from the first pressure-receiving chambers 154 is provided on the lower end surface 155 of the extension-side pilot case 22. The back-pressure delivery passage 161 (the downstream-side back-pressure delivery passage) is opened to the second pressure-receiving chamber 167. The second pressure-receiving chamber 167 is defined by a second seat portion 168 (a sub valve seat portion). The second seat portion 168 extends in a circular arc form between a pair of adjacent first pressure-receiving chambers 154 (the first seat portions 156).

Comparing the distance from the center of the extension-side pilot case 22 (the radius), the second seat portion 168, the seat portion 35, and the first seat portion 156 are ranked in ascending order. Further, as illustrated in FIG. 3, the height from the lower end surface 155 of the extension-side pilot case 22 is the same among the lower end surfaces of the first seat portion 156, the second seat portion 168, the seat portion 157, and the inner peripheral portion of the bottom portion 27 of the extension-side pilot case 22.

A first orifice 169 is provided on the second seat portion 168. The first orifice 169 establishes communication between the second pressure-receiving chamber 167 and the cylinder lower chamber 2B (the chamber on the downstream side). The flow passage area of the first orifice 169 is smaller than the flow passage areas of the orifice 152 and the orifice 153 (the second orifice) provided in the extension-side back-pressure delivery passage (the upstream-side back-pressure delivery passage). The first orifice 169 is formed by coining (applying coining processing to) the end surface of the second seat portion 168 (the surface on which the sub valve 30 is seated). As a result, an extension-side communication passage (a communication passage) establishing communication between the cylinder lower chamber 2B and the extension-side back-pressure chamber 25 is formed in the extension-side valve mechanism 21.

Through the extension-side communication passage, the hydraulic fluid in the cylinder lower chamber 2B (the chamber switched to the upstream side according to the movement of the piston in the opposite direction) is delivered into the extension-side back-pressure chamber 25 via the first orifice 169, the second pressure-receiving chamber 167, the back-pressure delivery passage 161 (the downstream-side back-pressure delivery passage), the pressure-receiving chamber 164, and the check valve 33 according to the movement of the piston 3 in the compression direction (the opposite direction). Further, the hydraulic fluid delivered into the extension-side back-pressure chamber 25 flows to the cylinder upper chamber 2A (a chamber switched to the downstream side according to the movement of the piston in the opposite direction) via the extension-side back-pressure delivery passage (the upstream-side back-pressure delivery passage), i.e., the orifice 153 (the second orifice), the orifice 152, the extension-side main pressure-receiving chamber 160, and the extension-side passage 19. Then, the flow passage area of the first orifice 169 is smaller than the minimum flow passage area in the extension-side communication passage and the minimum flow passage area in the extension-side back-pressure delivery passage.

The compression-side valve mechanism 51 includes a bottomed cylindrical compression-side pilot case 52 (the case member) attached to the small-diameter portion 18 of the piston rod 10. The compression-side pilot case 52 includes a cylindrical portion 56 (the tubular portion) and a bottom portion 57. The cylindrical portion 56 includes an opening portion 58 (refer to FIG. 3) on the piston 3 side (the one side). An extension-side main valve 53 is disposed on the opening portion 58. The compression-side valve mechanism 51 includes a seat portion 54 and a compression-side back-pressure chamber 55. The seat portion 54 is formed on the outer peripheral side of the upper end surface of the piston 3, and the compression-side main valve 53 is in abutment with the seat portion 54 so as to be able to be separably seated thereon. The compression-side back-pressure chamber 55 is formed between the compression-side pilot case 52 and the back surface of the compression-side main valve 53. The pressure in the compression-side back-pressure chamber 55 is applied to the compression-side main valve 53 in a valve-closing direction. The compression-side main valve 53 is a packing valve in which an annular packing 61 made of an elastic member is in contact with the inner peripheral surface (the tubular portion) of the compression-side pilot case 52 along the entire circumference thereof.

The hydraulic fluid is delivered from the cylinder lower chamber 2B (the chamber on the upstream side) into the compression-side back-pressure chamber 55 via a compression-side back-pressure delivery passage (the upstream-side back-pressure delivery passage), i.e., the compression-side passage 20, an annular compression-side main pressure-receiving chamber 180 defined by the seat portion 54, an orifice 172 provided on a retainer 171, and an orifice 173 (the second orifice) provided on the compression-side main valve 53. The retainer 171 is provided between the piston 3 and the compression-side main valve 53. The compression-side back-pressure chamber 55 is in communication with the cylinder upper chamber 2A via a passage 62 formed in the compression-side pilot case 52 and a sub valve 60. The sub valve 60 is opened when the pressure in the compression-side back-pressure chamber 55 reaches a predetermined pressure, and applies a resistance force to a flow of the hydraulic fluid directed from the compression-side back-pressure chamber 55 to the cylinder upper chamber 2A (the chamber on the downstream side).

The compression-side back-pressure chamber 55 is in communication with a first pressure-receiving chamber 174 formed between the compression-side pilot case 52 and the sub valve 60 via the passage 62. As illustrated in FIG. 2, the first pressure-receiving chamber 174 is defined in a circle sector-like form by an endless first seat portion 176 provided on an upper end surface 175 of the compression-side pilot case 52 (a surface opposite from the compression-side main valve 53 side). A seat portion 177 is provided on the inner side of the first seat portion 176. The sub valve 60 is seated on the seat portion 177. The passage 62 is opened to a portion of the upper end surface 175 between the seat portion 177 and a circular arc-shaped outer peripheral portion 178 of the first seat portion 176. A plurality of first pressure-receiving chambers 174 ("five" chambers 174 in the first embodiment) is provided on the upper end surface 175 of the compression-side pilot case 52 at even intervals circumferentially.

As illustrated in FIG. 1, a back-pressure delivery passage 181 (a downstream-side back-pressure delivery passage) is provided in the compression-side pilot case 52. In the back-pressure delivery passage 181, a flow of the hydraulic fluid from the cylinder upper chamber 2A (the chamber switched to the upstream side) to the compression-side back-pressure chamber 55 is generated due to a movement of the piston 3 in an extension direction (the opposite direction). An annular seat portion 65 is provided on a lower end surface 182 of the compression-side pilot case 52 (a surface on the compression-side main valve 53 side, refer to FIG. 3). The seat portion 65 defines an annular pressure-receiving chamber 184 provided on the outer periphery of the inner peripheral portion of the bottom portion 37. The seat portion 65 is located at the same axial height (the "vertical height" in FIG. 3) as the lower end surface of the inner peripheral portion of the bottom portion 57.

A disk-like check valve 63 is in abutment with the seat portion 65 so as to be able to be separably seated thereon. The check valve 63 permits a flow of the hydraulic fluid from the back-pressure delivery passage 181 to the compression-side back-pressure chamber 55. The inner peripheral portion of the check valve 63, a spacer 186, the inner peripheral portion of the compression-side main valve 53, and the retainer 171 are interposed between the inner peripheral portion of the bottom portion 57 of the compression-side pilot case 52 and the inner peripheral portion 17 of the piston 3 in this order from the compression-side pilot case 52 side to the piston 3 side.

Referring to FIGS. 1 to 3, a second pressure-receiving chamber 187 isolated from the first pressure-receiving chambers 174 is provided on the upper end surface 175 of the compression-side pilot case 52. The back-pressure delivery passage 181 (the downstream-side back-pressure delivery passage) is opened to the second pressure-receiving chamber 187. The second pressure-receiving chamber 187 is defined by a second seat portion 188 (the sub valve seat portion). The second seat portion 188 extends in a circular arc form between a pair of adjacent first pressure-receiving chambers 174 (the first seat portions 176).

Comparing the distance from the center of the compression-side pilot case 52 (the radius), the second seat portion 188, the seat portion 65, and the first seat portion 176 are ranked in ascending order. Further, as illustrated in FIG. 3, the height from the upper end surface 175 of the compression-side pilot case 52 is the same among the upper end surfaces of the first seat portion 176, the second seat portion 188, the seat portion 177, and the inner peripheral portion of the bottom portion 57 of the compression-side pilot case 52.

A first orifice 189 is provided on the second seat portion 188. The first orifice 189 establishes communication between the second pressure-receiving chamber 187 and the cylinder upper chamber 2A (the chamber on the downstream side). The flow passage area of the first orifice 189 is smaller than the flow passage areas of the orifice 172 and the orifice 173 (the second orifice) provided in the compression-side back-pressure delivery passage (the upstream-side back-pressure delivery passage). The first orifice 189 is formed by coining (applying coining processing to) the end surface of the second seat portion 188 (the surface on which the sub valve 60 is seated). As a result, a compression-side communication passage (a communication passage) establishing communication between the cylinder upper chamber 2A and the compression-side back-pressure chamber 55 is formed in the compression-side valve mechanism 51.

Through the compression-side communication passage, the hydraulic fluid in the cylinder upper chamber 2A (the chamber switched to the upstream side according to the movement of the piston in the opposite direction) is delivered into the compression-side back-pressure chamber 55 via the first orifice 189, the second pressure-receiving chamber 187, the back-pressure delivery passage 181 (the downstream-side back-pressure delivery passage), the pressure-receiving chamber 184, and the check valve 63 according to the movement of the piston 3 in the extension direction (the opposite direction). Further, the hydraulic fluid delivered into the compression-side back-pressure chamber 55 flows to the cylinder lower chamber (the chamber switched to the downstream side according to the movement of the piston in the opposite direction) via the compression-side back-pressure delivery passage (the upstream-side back-pressure delivery passage), i.e., the orifice 173 (the second orifice), the orifice 172, the compression-side main pressure-receiving chamber 180, and the compression-side passage 20. Now, the flow passage area of the first orifice 189 is smaller than the minimum flow passage area in the compression-side communication passage and the minimum flow passage area in the compression-side back-pressure delivery passage.

The valve members of the extension-side valve mechanism 21 and the compression-side valve mechanism 51 are pressed between a pair of washers 79 and 80 and subjected to an axial force by tightening a nut 78 attached to a screw portion (not labeled) of the small-diameter portion 18 of the piston rod 10.

(Extension Stroke) During the extension stroke, the hydraulic fluid in the cylinder upper chamber 2A (the chamber on the upstream side) is delivered into the extension-side back-pressure chamber 25 via the upstream-side back-pressure delivery passage, i.e., the extension-side passage 19, the extension-side main pressure-receiving chamber 160, the orifice 152, and the orifice 153 (the second orifice). On the other hand, the hydraulic fluid in the cylinder upper chamber 2A is delivered into the compression-side back-pressure chamber 55 via the compression-side communication passage, i.e., the first orifice 189, the second pressure-receiving chamber 187, the back-pressure delivery passage 181 (the downstream-side back-pressure delivery passage), and the check valve 63. As a result, the compression-side main valve 53 can be prevented from being opened under the pressure in the cylinder upper chamber 2A during the extension stroke.

Further, the hydraulic fluid delivered into the compression-side back-pressure chamber 55 during the extension stroke flows to the cylinder lower chamber 2B (the chamber on the downstream side) via the orifice 173 (the second orifice), the orifice 172, the compression-side main pressure-receiving chamber 180, and the compression-side passage 20, and therefore a damping force according to an orifice characteristic due to the orifices 172 and 173 can be acquired before the extension-side main valve 23 is opened, i.e., in a region where the piston speed is a low speed.

Then, in the first embodiment, the first orifice 189 has the smallest flow passage area throughout the communication passage establishing the communication between the cylinder upper chamber 2A (the chamber on the upstream side) and the cylinder lower chamber 28 (the chamber on the downstream side) (the compression-side communication passage and the compression-side back-pressure delivery passage), i.e., the orifice 172 and the orifice 173 (the second orifice) are set so as to have larger flow passage areas than the flow passage area of the first orifice 189, and therefore the flow amount of the hydraulic fluid delivered from the cylinder upper chamber 2A into the compression-side back-pressure chamber 55 via the first orifice 189 (an inflow amount) does not exceed the flow amount of the hydraulic fluid transmitted from the compression-side back-pressure chamber 55 to the cylinder lower chamber 2B via the orifices 172 and 173 (an outflow amount) during the extension stroke.

Therefore, in the first embodiment, the pressure in the compression-side back-pressure chamber 55 does not excessively increase (does not exceed a predetermined pressure) during the extension stroke. As a result, the first embodiment can prevent overshoot of the damping force due to a delay in the valve opening of the compression-side main valve 53 due to the remaining pressure in the compression-side back-pressure chamber 55 when the stroke of the piston 3 is switched from the extension stroke to the compression stroke (when the movement of the piston 3 is switched from the one direction to the opposite direction), and therefore can acquire a stable damping force.

(Compression Stroke) During the compression stroke, the hydraulic fluid in the cylinder lower chamber 2B (the chamber on the upstream side) is delivered into the compression-side back-pressure chamber 55 via the upstream-side back-pressure delivery passage, i.e., the compression-side passage 20, the compression-side main pressure-receiving chamber 180, the orifice 172, and the orifice 173 (the second orifice). On the other hand, the hydraulic fluid in the cylinder lower chamber 2B is delivered into the extension-side back-pressure chamber 25 via the extension-side communication passage, i.e., the first orifice 169, the second pressure-receiving chamber 167, the back-pressure delivery passage 161 (the downstream-side back-pressure delivery passage), and the check valve 33.

As a result, the extension-side main valve 23 can be prevented from being opened under the pressure in the cylinder lower chamber 2B during the compression stroke. Further, the hydraulic fluid delivered into the extension-side back-pressure chamber 25 flows to the cylinder upper chamber 2A (the chamber on the downstream side) via the orifice 153 (the second orifice), the orifice 152, the extension-side main pressure-receiving chamber 160, and the extension-side passage 19, and therefore a damping force according to an orifice characteristic due to the orifices 152 and 153 can be acquired before the compression-side main valve 53 is opened. i.e., in the region where the piston speed is a low speed.

Then, in the first embodiment, the first orifice 169 has the smallest flow passage area throughout the communication passage establishing the communication between the cylinder lower chamber 2B (the chamber on the upstream side) and the cylinder upper chamber 2A (the chamber on the downstream side) (the extension-side communication passage and the extension-side back-pressure delivery passage), i.e., the orifice 152 and the orifice 153 (the second orifice) are set so as to have larger flow passage areas than the flow passage area of the first orifice 169, and therefore a flow amount of the hydraulic fluid delivered from the cylinder lower chamber 28 into the extension-side back-pressure chamber 25 via the first orifice 169 (an inflow amount) does not exceed a flow amount of the hydraulic fluid transmitted from the extension-side back-pressure chamber 25 to the cylinder upper chamber 2A via the orifices 152 and 153 (an outflow amount) during the compression stroke.

Therefore, in the first embodiment, the pressure in the extension-side back-pressure chamber 25 does not excessively increase (does not exceed a predetermined pressure) during the compression stroke. As a result, the first embodiment can prevent overshoot of the damping force due to a delay in the valve opening of the extension-side main valve 23 due to the remaining pressure in the extension-side back-pressure chamber 25 when the stroke of the piston 3 is switched from the compression stroke to the extension stroke (when the movement of the piston 3 is switched from the one direction to the opposite direction), and therefore can acquire a stable damping force.

Now, in the conventional shock absorber, the pressure in the back-pressure chamber may excessively increase due to the hydraulic fluid delivered from the downstream-side back-pressure delivery passage and this may lead to a delay in the valve opening of the main valve due to the remaining pressure in the back-pressure chamber and thus cause overshoot of the damping force when the piston is switched to the movement in the opposite direction. The overshoot of the damping force can be prevented by reducing the flow passage area of the downstream-side back-pressure delivery passage, i.e., reducing the hole diameter of the run-through hole, but it is difficult to process such a small-diameter run-through hole on the pilot case that the flow passage area of the downstream-side back-pressure delivery passage is minimized throughout the communication passage establishing the communication between the back-pressure chamber and the chamber switched to the downstream side according to the movement of the piston in the opposite direction.

In light thereof, in the first embodiment, the shock absorber 1 includes the first seat portions 156 and 176 provided on the end surfaces 162 and 182 (the bottom portions) of the pilot cases 22 and 52 and defining the first pressure-receiving chambers 154 and 174 in communication with the back-pressure chambers 25 and 55, the downstream-side back-pressure delivery passages 161 and 181 provided in the pilot cases 22 and 52 and configured in such a manner that the flow of the hydraulic fluid is generated from the cylinder chambers 28 and 2A switched to the upstream side according to the movement of the piston 3 in the opposite direction into the back-pressure chambers 25 and 55, the second seat portions 168 and 188 provided on the end surfaces 162 and 182 (the bottom portions) of the pilot cases 22 and 52 and defining the second pressure-receiving chambers 167 and 187 arranged in communication with the downstream-side back-pressure delivery passages 161 and 181 and isolated from the first pressure-receiving chambers 154 and 174, the first orifices 169 and 189 provided on the second seat portions 168 and 188 and arranged in communication with the downstream-side back-pressure delivery passages 161 and 181, the upstream-side back-pressure delivery passages used to deliver the hydraulic fluid from the chambers 2A and 28 on the upstream side into the back-pressure chambers 25 and 55, and the second orifices 153 and 173 provided in the upstream-side back-pressure delivery passages and having larger flow passage areas than the first orifices 169 and 189.

According to the first embodiment, since the flow passage area of each of the first orifices 169 and 189 is the smallest throughout the communication passage establishing the communication between the chamber 2A or 2B on the upstream side and the chamber 2B or 2A on the downstream side, the flow amount of the hydraulic fluid delivered from the chamber 2A or 2B on the upstream side into the back-pressure chamber 55 or 26 via the first orifice 189 or 169 (the inflow amount) due to the movement of the piston 3 in the one direction does not exceed the flow amount of the hydraulic fluid transmitted from the back-pressure chamber 55 or 26 to the chamber 2B or 2A on the downstream side via the second orifice 173 or 153 (the outflow amount), and therefore the pressure in the back-pressure chamber 55 or 26 is prevented from excessively increasing. As a result, the first embodiment can prevent overshoot of the damping force due to a delay in the valve opening of the main valve 53 or 23 due to the remaining pressure in the back-pressure chamber 55 or 26 when the movement of the piston 3 is switched from the one direction to the opposite direction, and therefore can acquire a stable damping force.

Then, in the first embodiment, each of the first orifices 169 and 189 is formed by coining (applying the coining processing to) it, and therefore the orifice (the passage) satisfying an extremely small flow passage area can be formed easily and highly accurately.

(Second Embodiment) Next, a second embodiment will be described with reference to FIGS. 4 to 6.

The second embodiment will be described, assigning the same names and reference numerals to portions shared with the first embodiment, and omitting redundant descriptions thereof.

In the first embodiment, the small-diameter portion 18 of the piston rod 10 is inserted through the axial hole 4 of the piston 3. On the other hand, in the second embodiment, a shaft portion 6 of a piston bolt 5 is inserted through the axial hole 4 of the piston 3. As illustrated in FIG. 4, the piston bolt 5 includes a head portion 7 and a cylindrical portion 8. The head portion 7 is provided at the upper end portion of the shaft portion 6. The cylindrical portion 8 is formed on the outer peripheral edge portion of this head portion 7. The cylindrical portion 8 is opened on the upper end side thereof, and has a larger outer diameter than the head portion 7. The lower end portion of a solenoid case 94 is connected to the cylindrical portion 8 by screw coupling. A pilot chamber 11 of a pilot valve 81 (a pilot control valve), which will be described below, is provided in the shaft portion 6 of the piston bolt 5.

Figure 5:
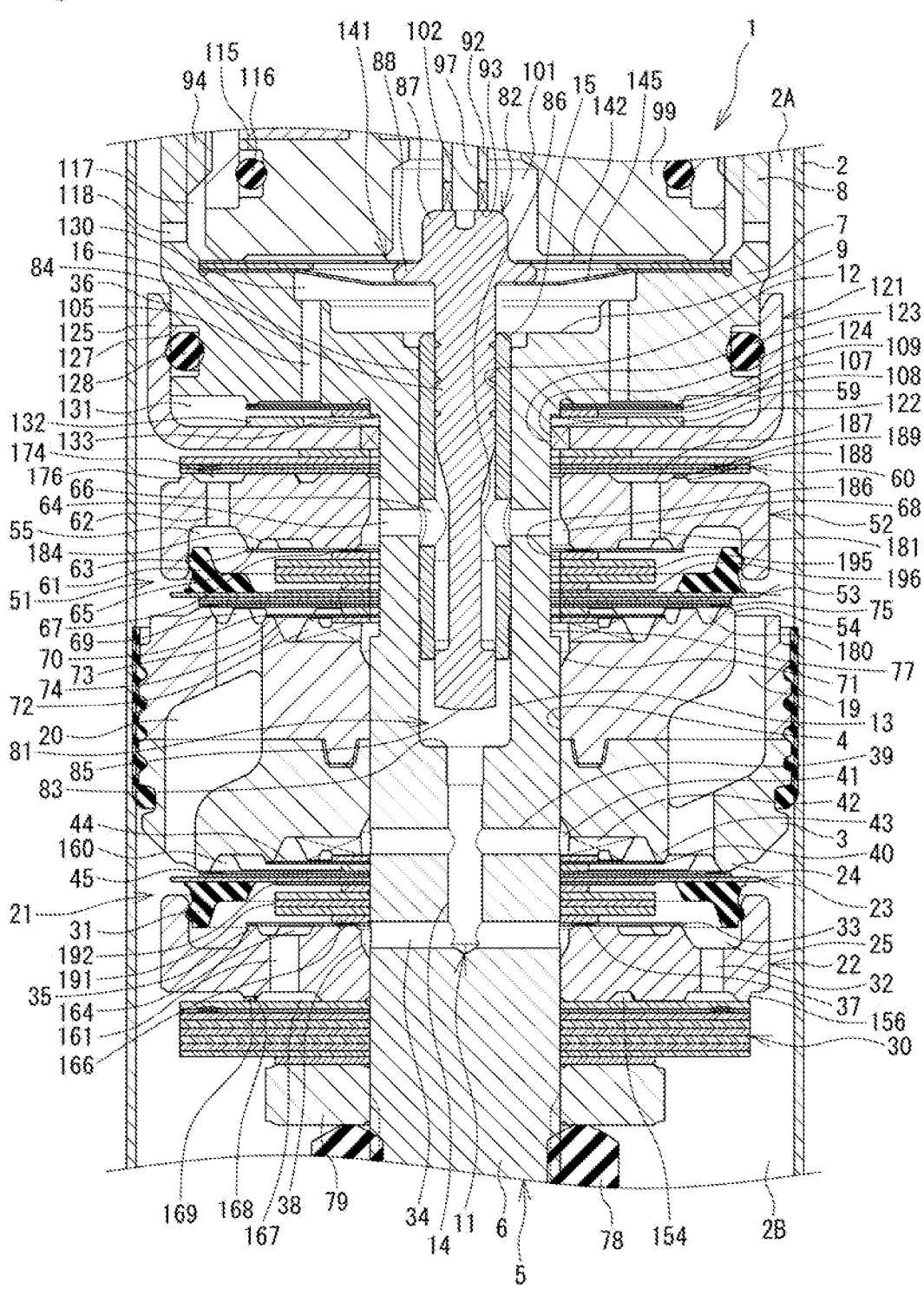
FIG. 5 is an enlarged view of main portions illustrated in FIG. 4.

As illustrated in FIG. 5, the pilot chamber 11 includes an axial passage 12 formed inside a sleeve 15 (an axial hole). The upper end of the sleeve 15 is fittedly attached in a hole 16 opened to the head portion 7 of the piston bolt 5. The pilot chamber 11 includes an axial hole 13 formed at the lower portion of the hole 16 (a portion on the lower side with respect to the lower end of the sleeve 15). The pilot chamber

11 includes an axial passage 14 formed by a small-diameter hole opened to the radial hole 16 at the upper end thereof. The inner diameter of the pilot chamber 11 is maximized at the axial passage 13, and is reducing in an order of the axial passage 12 and the axial passage 14. The axial passage 12 is opened to an end surface 9 of the head portion 7 of the piston bolt 5.

Figure 4:
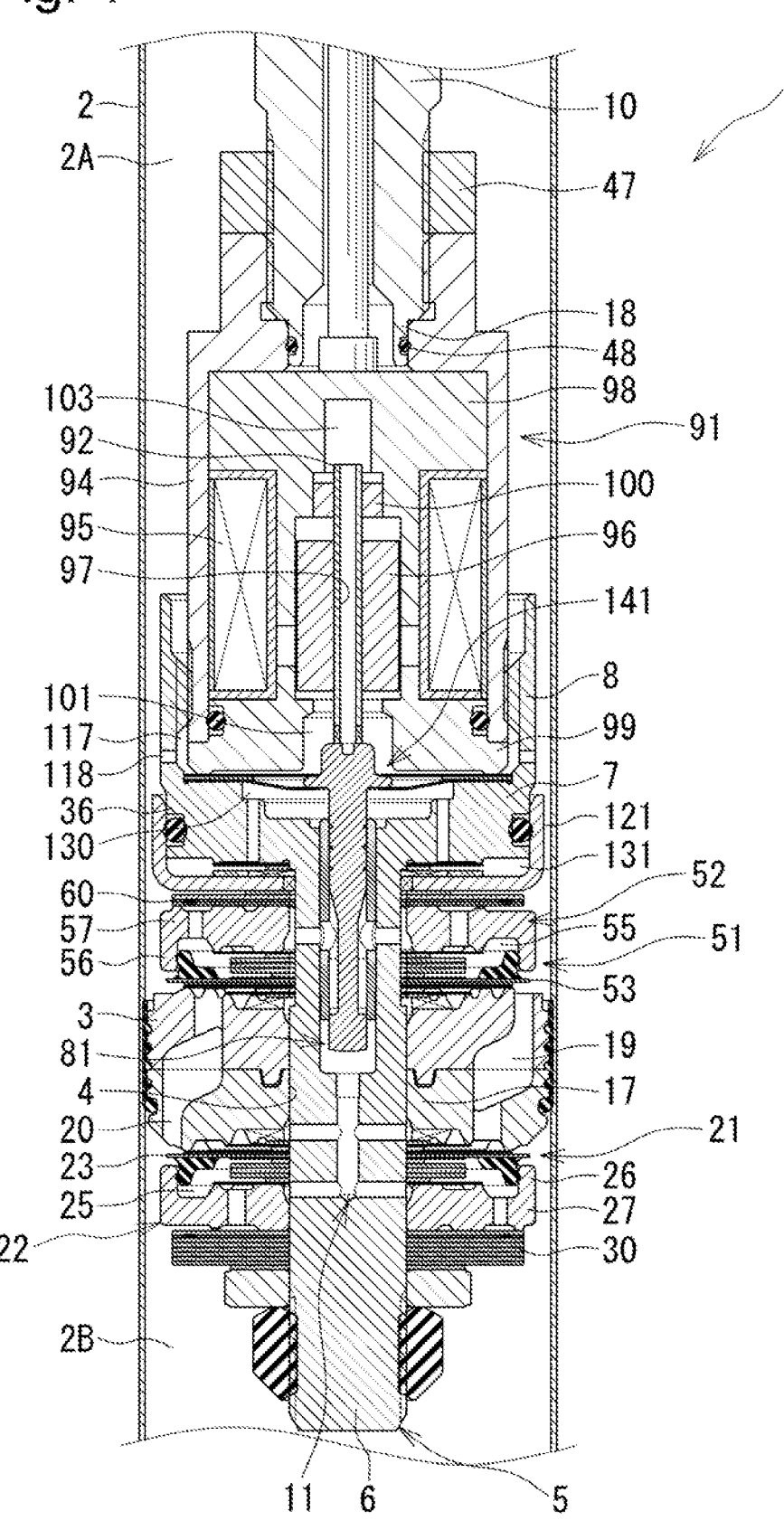
FIG. 4 is a cross-sectional view of a shock absorber according to a second embodiment taken along an axial plane.

As illustrated in FIG. 4, the lower end portion of the piston rod 10 is connected to the upper end portion of the solenoid case 94 by screw coupling. The upper end side of the piston rod 10 extends out of the cylinder 2. A nut 47 serving as a loose stopper is attached to the lower end portion (a screw portion) of the piston rod 10. The small-diameter portion 18 is formed at the lower end portion of the piston rod 10 (on the lower side with respect to the screw portion). A seal member 48 is set in an annular groove (not labeled) formed on the outer peripheral surface of the small-diameter portion 18. The seal member 48 seals between the solenoid case 94 and the piston rod 10.

Figure 6:
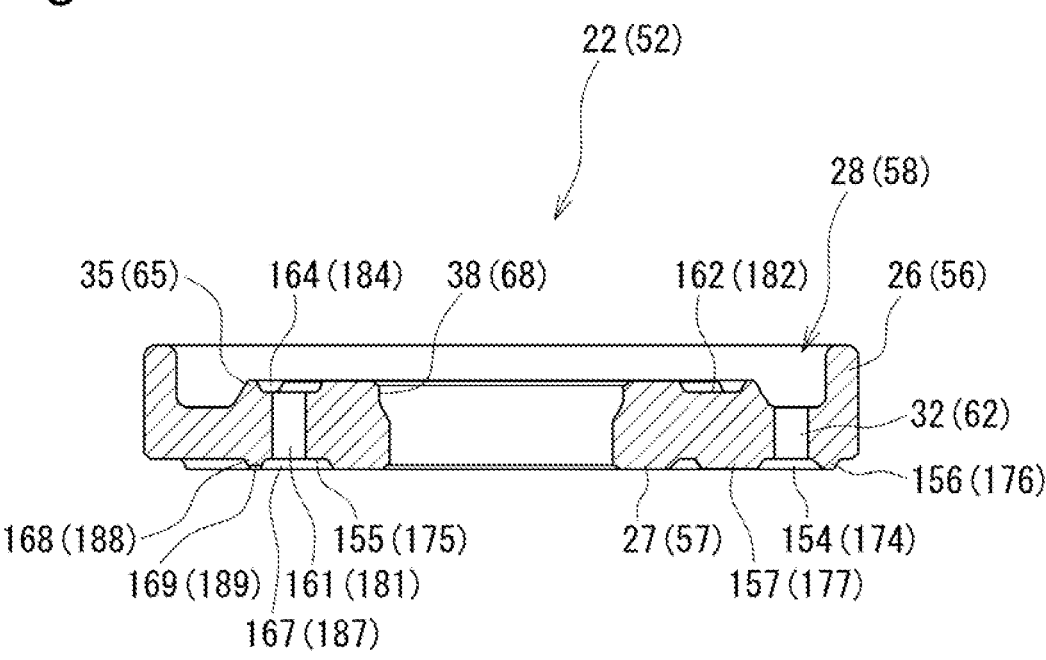
FIG. 6 is a cross-sectional view of a pilot case according to the second embodiment taken along the axial plane.

As illustrated in FIG. 5, the extension-side back-pressure chamber 25 is in communication with a radial passage 34 formed in the shaft portion 6 of the piston bolt 5 via an orifice 37 (the second orifice) provided on the inner peripheral portion of the check valve 33 and an annular passage 38 formed on the inner peripheral portion of the bottom portion 27 of the extension-side pilot case 22 (refer to FIG. 6). The radial passage 34 is in communication with the axial passage 14. The axial passage 14 is in communication with a radial passage 39 formed in the shaft portion 6 of the piston bolt 5. The radial passage 39 is in communication with the extension-side passage 19 via an annular passage 41 formed at the lower end portion of the axial hole 4 of the piston 3, a plurality of cutouts 42 formed on the inner peripheral portion 17 of the piston 3, and a disk valve 40 provided on the piston 3.

Referring to FIGS. 4 and 5, the disk valve 40 is in abutment with an annular seat portion 43 so as to be able to be separably seated thereon. The seat portion 43 is provided on the inner peripheral side of the piston 3 with respect to the seat portion 24 and the opening of the extension-side passage 19. The disk valve 40 is a check valve that permits a flow of the hydraulic fluid from the radial passage 39 to the extension-side passage 19. A retainer 191, a retainer 192, the extension-side main valve 23, and the disk valve 40 are interposed between the inner peripheral portion of the bottom portion 27 of the extension-side pilot case 22 and the inner peripheral portion 17 of the piston 3 in this order starting from the extension-side pilot case 22 side via spacers.

The compression-side back-pressure chamber 55 is in communication with a radial passage 64 formed in the shaft portion 6 of the piston bolt 5 via an orifice 67 (the second orifice) provided on the inner peripheral portion of the check valve 63, a width-across-flats portion 77 formed on the shaft portion 6 of the piston bolt 5, and an annular passage 68 formed on the inner peripheral portion of the bottom portion 57 of the compression-side pilot case 52 (refer to FIG. 6). The radial passage 64 is in communication with the axial passage 12 via a hole 66 formed on the side wall of the sleeve 15. The radial passage 64 is in communication with the compression-side passage 20 via the width-across-flats portion 77, an annular passage 71 formed at the upper end portion of the axial hole 4 of the piston 3, a plurality of cutouts 72 formed on the inner peripheral portion 17 of the piston 3, and a disk valve 70 provided on the piston 3.

Referring to FIGS. 4 and 5, the disk valve 70 is in abutment with an annular seat portion 73 so as to be able to be separably seated thereon. The seat portion 73 is provided on the inner peripheral side of the piston 3 with respect to the seat portion 54 and the opening of the compression-side passage 20. The disk valve 70 is a check valve that permits a flow of the hydraulic fluid from the radial passage 64 to the compression-side passage 20. A retainer 195, a retainer 196, the compression-side main valve 53, and the disk valve 70 are interposed between the inner peripheral portion of the bottom portion 57 of the compression-side pilot case 52 and the inner peripheral portion 17 of the piston 3 in this order starting from the compression-side pilot case 52 side via spacers. Further, a seat portion 57 is provided between the seat portion 54 of the piston 3 and the seat portion 73. The compression-side main valve 53 is in abutment with the seat portion 57 so as to be able to be separably seated thereon. The outer peripheral side (the seat portion 54 side) and the inner peripheral side (the seat portion 73 side) of the seat portion 57 are in communication with each other via the compression-side passage 20.

A flow of the hydraulic fluid in the pilot chamber 11 of the piston bolt 5 is controlled by the pilot valve 81 (the pilot control valve). The pilot valve 81 includes a valve spool 82 and a seat portion 83. The valve spool 82 is slidably provided in the pilot chamber 11. The seat portion 83 is formed on the circumferential edge of the opening of the axial passage 14 at the bottom portion of the hole 16. The valve spool 82 is formed by a solid shaft, and includes a slidable portion 84, a valve body 85, and a connection portion 86. The slidable portion 84 is inserted in the sleeve 15. The valve body 85 is in abutment with the seat portion 83 so as to be able to be separably seated thereon. The connection portion 86 connects the slidable portion 84 and the valve body 85.

A head portion 87 of the valve spool 82 is formed at the upper end of the slidable portion 84. A spring bearing portion 88 shaped like an outer flange is formed at the lower end portion of the head portion 87. The inner peripheral portion of a spring disk 145 is connected to the spring bearing portion 88. The spring disk 145 biases the valve body 85 in a valve-opening direction. As a result, the head portion 87 of the valve spool 82 is placed in abutment with (is pressed against) a lower end surface 93 of an actuation rod 92 of a solenoid 91 (refer to FIG. 4). A first chamber 130 is formed on the outer periphery of the head portion 87 of the valve spool 82.

As illustrated in FIG. 5, a bottomed cylindrical cap 121, which is opened at the upper end side thereof, is attached to an outer peripheral surface 36 of the head portion 7 of the piston bolt 5. An insertion hole 123 is provided at a bottom portion 122 of the cap 121. The shaft portion 6 of the piston bolt 5 is inserted through the insertion hole 123. A plurality of cutouts 124 (two cutouts 124 are illustrated in FIG. 5) is provided on the outer periphery of the insertion hole 123. The cutouts 124 are in communication with the width-across-flats portion 77 formed on the shaft portion 6. An annular groove 127 is provided on the outer peripheral surface 36 of the head portion 7 of the piston bolt 5. A seal member 128 is set in the annular groove 127. The seal member 128 seals between the head portion 7 of the piston bolt 5 and a cylindrical portion 125 of the cap 121. An annular second chamber 131 is formed between the head portion 7 of the piston bolt 5 and the cap 121.

A spool back-pressure relief valve 107, a spacer 108, and a retainer 132 are provided between the head portion 7 of the piston bolt 5 and the bottom portion 122 of the cap 121 in this order starting from the head portion 7 side. The spool back-pressure relief valve 107, the spacer 108, and the retainer 132 are provided in the second chamber 131. The spool back-pressure relief valve 107 is a check valve that permits a flow of the hydraulic fluid from the first chamber 130 to the second chamber 131 via a passage 105 formed in the head portion 7. The outer peripheral edge portion of the spool back-pressure relief valve 107 is in abutment with an annular seal portion 109 so as to be able to be separably seated thereon. The seat portion 109 is formed on the lower end surface of the head portion 7 of the piston bolt 5.

A plurality of cutouts 133 is provided on the inner peripheral edge portion of the retainer 132. The plurality of cutouts 133 establishes communication of the second chamber 131 with the width-across-flats portion 77 and the cutouts 124 of the cap 121. A retainer 59 is interposed between the bottom portion 122 of the cap 121 and the sub valve 60. The retainer 59 defines a maximum valve-opening amount of the sub valve 60.

A fail-safe valve 141 is formed in the first chamber 130. The fail-safe valve 141 includes a disk 142 (a valve seat). The spring bearing portion 88 (a valve body) of the head portion 87 of the valve spool 82 is in abutment with the disk 142 so as to be able to be separably seated thereon. The outer peripheral edge portions of the disk 142 and the spring disk 145 are held between the head portion 7 of the piston bolt 5 and a core 99 of the solenoid 91. Then, in a failure state (a state in which the thrust force of the solenoid 91 is zero), the fail-safe valve 141 is closed due to the spring bearing portion 88 placed in abutment with (pressed against) the disk 142 under the biasing force of the spring disk 145.

As illustrated in FIG. 4, the solenoid 91 includes the actuation rod 92, the solenoid case 94, and a coil 95. A plunger 96 is coupled with the outer periphery of the actuation rod 92. The plunger 96 generates a thrust force by power supply to the coil 95. A rod inner passage 97 is formed inside the actuation rod 92. The actuation rod 92 is guided vertically (axially) by a bush 100 provided in a core 98.

As illustrated in FIG. 5, an annular groove 115 is formed on the outer peripheral surface of the core 99. A seal member 116 is set in the annular groove 115. The seal member 116 seals between the lower end portion of the solenoid case 94 and the core 99. Due to this configuration, an annular passage 117 is formed between the piston bolt 5 and the core 99 of the solenoid case 94. The annular passage 117 is in communication with the cylinder upper chamber 2A via a passage 118 provided at the lower end portion of the cylindrical portion 8 of the piston bolt 5.

Referring to FIGS. 4 and 5, a spool back-pressure chamber 101 is formed inside the core 99 of the solenoid 91. The spool back-pressure chamber 101 is in communication with a rod back-pressure chamber 103 via a cutout 102 of the actuation rod 92 and the rod inner passage 97. Then, when no power is supplied to the coil 95, the valve spool 82 is biased in a valve-opening direction of the pilot valve 81 (the valve body 85) (the "upward direction" in FIG. 4) under the biasing force of the spring disk 145, and the spring bearing portion 88 is kept in abutment with the disk 142. Due to this abutment, the communication between the spool back-pressure chamber 101 and the first chamber 130 is blocked.

On the other hand, when power is supplied to the coil 95, the valve spool 82 is biased in a valve-closing direction of the pilot valve 81 (the valve body 85) (the "downward direction" in FIG. 4) under the thrust force generated by the plunger 96. Accordingly, the valve spool 82 is moved against the biasing force of the spring disk 145, and the valve body 85 is seated on the seat portion 83. Now, the valve-opening pressure of the pilot valve 81 can be adjusted by controlling the power supply to the coil 95. At the time of a soft mode in which power is supplied to the coil 95 with a low current value, the biasing force of the spring disk 145 and the thrust force generated by the plunger 96 are balanced, and the valve body 85 is kept in a state of being separated from the seat portion 83 by a predetermined distance.

(Extension Stroke) During the extension stroke, the hydraulic fluid in the cylinder upper chamber 2A (the chamber on the upstream side) is delivered into the extension-side back-pressure chamber 25 via the upstream-side back-pressure delivery passage, i.e., the extension-side passage 19, the orifice 44 formed on the disk valve 40, the cutouts 42 formed on the piston 3, the annular passage 41 formed in the axial hole 4 of the piston 3, the radial passage 39, the axial passage 14, the radial passage 34, the annular passage 38 formed in the extension-side pilot case 22, and the orifice 37 (the second orifice) formed on the check valve 33.

Further, during the extension stroke, the hydraulic fluid in the cylinder upper chamber 2A (the chamber on the upstream side) is delivered into the compression-side back-pressure chamber 55 via the compression-side communication passage, i.e., the first orifice 189 formed on the second seat portion 188 (the sub valve seat portion), the second pressure-receiving chamber 187, the back-pressure delivery passage 181 (the downstream-side back-pressure delivery passage), and the check valve 63. As a result, the compression-side main valve 53 can be prevented from being opened under the pressure in the cylinder upper chamber 2A during the extension stroke.

Further, the hydraulic fluid delivered into the compression-side back-pressure chamber 55 during the extension stroke flows to the cylinder lower chamber 2B (the chamber on the downstream side) via the orifice 67 (the second orifice) formed on the check valve 63, the width-across-flats portion 77 formed on the shaft portion 6 of the piston bolt 5, the annular passage 71 formed on the inner peripheral portion of the bottom portion 57 of the compression-side pilot case 52, the cutouts 72 formed on the inner peripheral portion 17 of the piston 3, the disk valve 70, and the compression-side passage 20, and therefore a damping force according to an orifice characteristic due to the orifice 67 and a valve characteristic due to the disk 70 can be acquired before the extension-side main valve 23 is opened, i.e., in the region where the piston speed is a low speed.

Then, in the second embodiment, the first orifice 189 has the smallest flow passage area throughout the communication passage establishing the communication between the cylinder upper chamber 2A (the chamber on the upstream side) and the cylinder lower chamber 2B (the chamber on the downstream side) (the compression-side communication passage and the compression-side back-pressure delivery passage), i.e., the orifice 67 (the second orifice) is set so as to have a larger flow passage area than the flow passage area of the first orifice 189, and therefore a flow amount of the hydraulic fluid delivered from the cylinder upper chamber 2A into the compression-side back-pressure chamber 55 via the first orifice 189 (an inflow amount) does not exceed a flow amount of the hydraulic fluid transmitted from the compression-side back-pressure chamber 55 to the cylinder lower chamber 2B via the orifice 67 (an outflow amount) during the extension stroke.

Therefore, in the second embodiment, the pressure in the compression-side back-pressure chamber 55 does not excessively increase (does not exceed a predetermined pressure) during the extension stroke. As a result, the second embodiment can prevent overshoot of the damping force due to a delay in the valve opening of the compression-side main valve 53 due to the remaining pressure in the compression-side back-pressure chamber 55 when the stoke of the piston 3 is switched from the extension stroke to the compression stroke (when the movement of the piston 3 is switched from the one direction to the opposite direction), and therefore can acquire a stable damping force.

(Compression Stroke) During the compression stroke, the hydraulic fluid in the cylinder lower chamber 2B (the chamber on the upstream side) is delivered into the compression-side back-pressure chamber 55 via the upstream-side back-pressure delivery passage, i.e., the compression-side passage 20, the orifice 74 formed on the disk valve 70, the cutouts 72 formed on the piston 3, the annular passage 71 formed in the axial hole 4 of the piston 3, the width-across-flats portion 77 formed on the shaft portion 6 of the piston bolt 5, and the orifice 67 (the second orifice) formed on the check valve 63.

Further, during the compression stroke, the hydraulic fluid in the cylinder lower chamber 2B (the chamber on the upstream side) is delivered into the extension-side back-pressure chamber 25 via the extension-side communication passage, i.e., the first orifice 169 formed on the second seat portion 168 (the sub valve seat portion), the second pressure-receiving chamber 167, the back-pressure delivery passage 161 (the downstream-side back-pressure delivery passage), and the check valve 33. As a result, the extension-side main valve 23 can be prevented from being opened under the pressure in the cylinder lower chamber 2B during the compression stroke.

Further, the hydraulic fluid delivered into the extension-side back-pressure chamber 25 during the compression stroke flows to the cylinder upper chamber 2A (the chamber on the downstream side) via the orifice 37 (the second orifice) formed on the check valve 33, the annular passage 38 formed on the inner peripheral portion of the bottom portion 27 of the extension-side pilot case 22, the radial passage 34, the axial passage 14, the radial passage 39, the annular passage 41 formed in the axial hole 4 of the piston 3, the cutouts 42 formed on the inner peripheral portion 17 of the piston 3, the disk valve 40, and the extension-side passage 19, and therefore a damping force according to an orifice characteristic due to the orifice 37 and a valve characteristic due to the disk 40 can be acquired before the compression-side main valve 53 is opened, i.e., in the region where the piston speed is a low speed.

Then, in the second embodiment, the first orifice 169 has the smallest flow passage area throughout the communication passage establishing the communication between the cylinder lower chamber 2B (the chamber on the upstream side) and the cylinder upper chamber 2A (the chamber on the downstream side) (the extension-side communication passage and the extension-side back-pressure delivery passage), i.e., the orifice 37 (the second orifice) is set so as to have a larger flow passage area than the flow passage area of the first orifice 169, and therefore a flow amount of the hydraulic fluid delivered from the cylinder lower chamber 2B into the extension-side back-pressure chamber 25 via the first orifice 169 (an inflow amount) does not exceed a flow amount of the hydraulic fluid transmitted from the extension-side back-pressure chamber 25 to the cylinder upper chamber 2A via the orifice 37 (an outflow amount) during the compression stroke.

Therefore, in the second embodiment, the pressure in the extension-side back-pressure chamber 25 does not excessively increase (does not exceed a predetermined pressure) during the compression stroke. As a result, the second embodiment can prevent overshoot of the damping force due to a delay in the valve opening of the extension-side main valve 23 due to the remaining pressure in the extension-side back-pressure chamber 25 when the stroke of the piston 3 is switched from the compression stroke to the extension stroke (when the movement of the piston 3 is switched from the one direction to the opposite direction), and therefore can acquire a stable damping force.

According to the second embodiment, advantageous effects equivalent to the above-described first embodiment can be acquired.

(Third Embodiment) Next, a third embodiment will be described with reference to FIGS. 7 to 9.

The third embodiment will be described, assigning the same names and reference numerals to portions shared with the second embodiment, and omitting redundant descriptions thereof.

In the second embodiment, the pressure in the pilot chamber 11 is released to the cylinder lower chamber 2B (the cylinder upper chamber 2A) by opening the sub valve 30 (the sub valve 60) via the back-pressure chamber 25 (the back-pressure chamber 55). On the other hand, in the third embodiment, the pressure in the pilot chamber 11 is released to the cylinder lower chamber 2B (the cylinder upper chamber 2A) by opening the sub valve 30 (the sub valve 60) directly without the intervention of the back-pressure chamber 25 (the back-pressure chamber 55).

Figure 7:
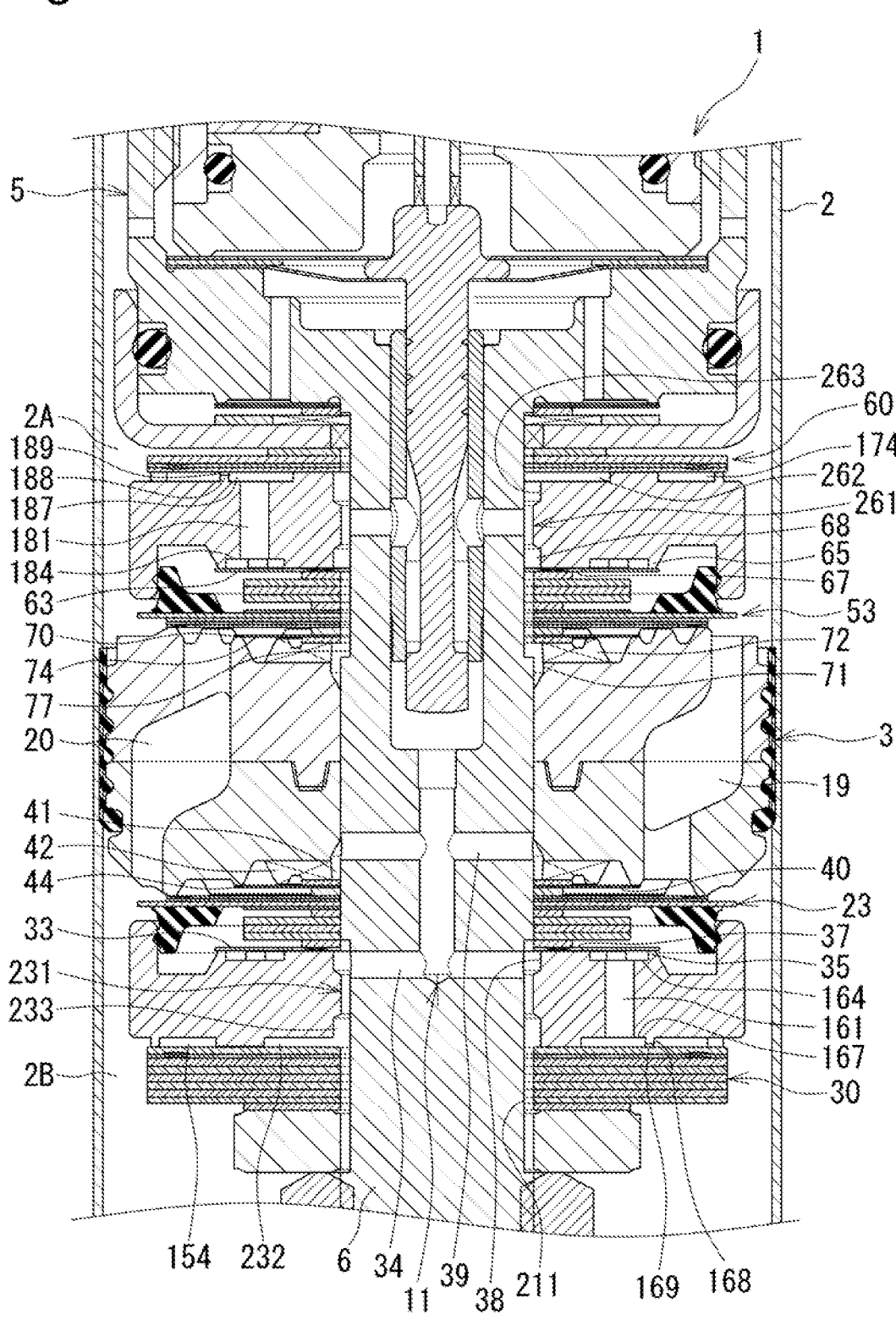
FIG. 7 is a cross-sectional view of main portions of a shock absorber according to a third embodiment taken along an axial plane.
Figure 8:
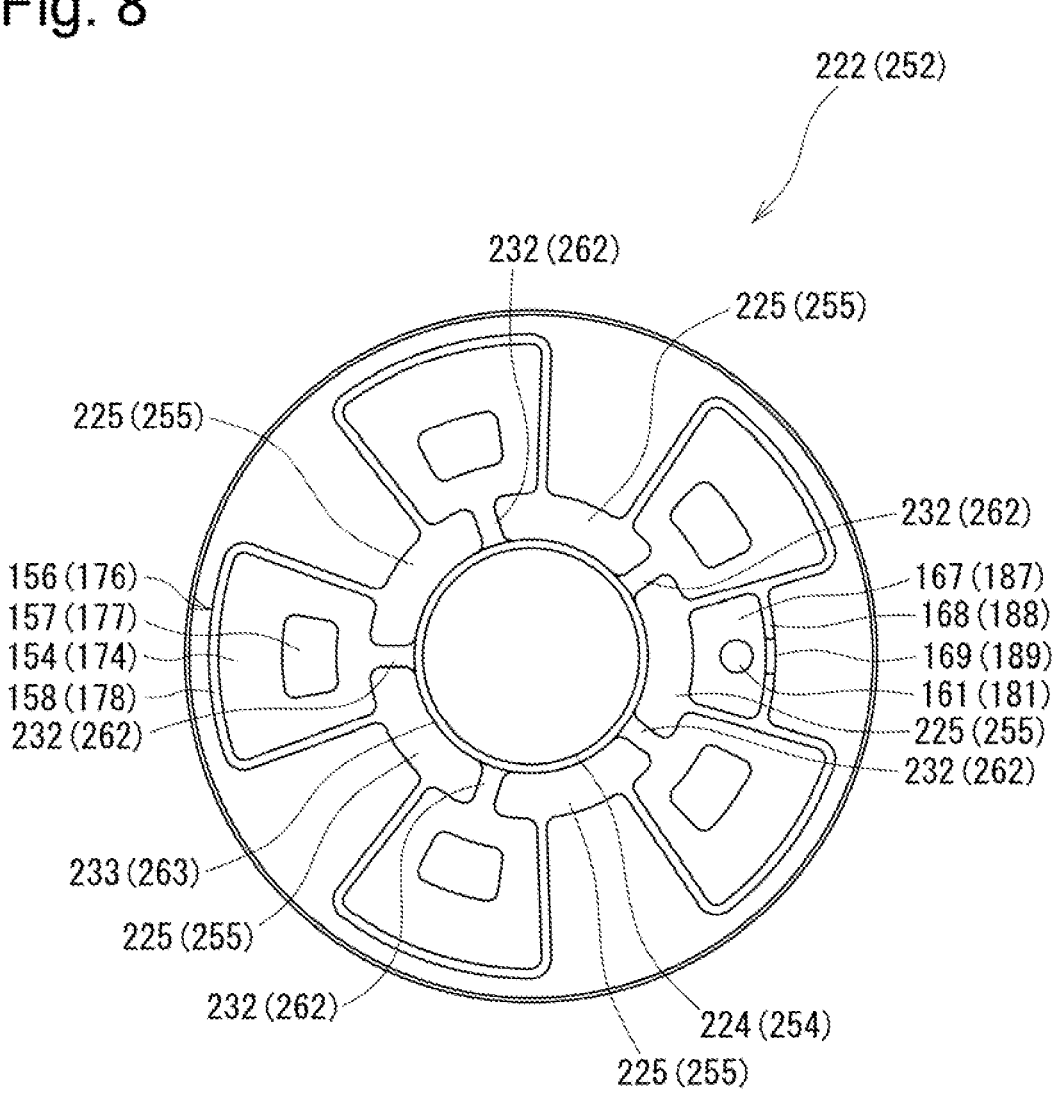
FIG. 8 is a front view of a pilot case according to the third embodiment.

As illustrated in FIG. 7, the pilot chamber 11 (the radial passage 34) is in communication with the first pressure-receiving chamber 154 via a case inner peripheral passage 231 formed between the shaft portion 6 of the piston bolt 5 and an extension-side pilot case 222, and a plurality of radially extending grooves 232 ("five" grooves 232 in the present embodiment, refer to FIG. 8) formed on an inner peripheral portion 223 of the extension-side pilot case 222. The plurality of grooves 232 is formed on an inner seat portion 225 of the inner peripheral portion 223 of the extension-side pilot case 222 on the sub valve 30 side.

The pilot chamber 11 (the radial passage 34) is in communication with a width-across-flats portion 211 (the upstream-side back-pressure delivery passage) formed on the shaft portion 6 of the piston bolt 5. The case inner peripheral passage 231 is formed by establishing communication between the annular passage 38 formed at the end portion of an axial hole 224 of the extension-side pilot case 222 on the piston 3 side (the "upper side" in FIGS. 7 and 8) and an annular passage 233 formed at the end portion of the axial hole 224 of the extension-side pilot case 222 on the sub valve 30 side (the "lower side" in FIGS. 7 and 8) via the width-across-flats portion 211.

Figure 9:
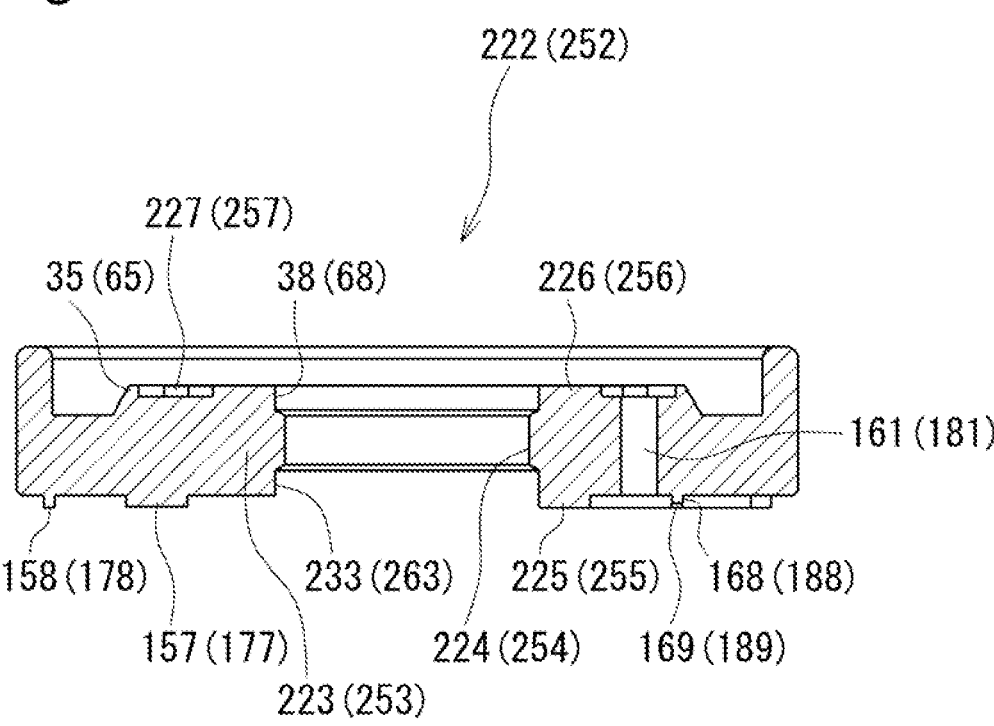
FIG. 9 is a cross-sectional view of the pilot case according to the third embodiment taken along the axial plane.

As illustrated in FIG. 9, a plurality of seat portions 227 extending in a circular arc form ("four" seat portions 227 in the third embodiment) is provided between an inner seat portion 256 of the inner peripheral portion 223 of the extension-side pilot case 222 and the seat portion 35.

Further, the extension-side back-pressure chamber 25 is in communication with the cylinder lower chamber 2B via the plurality of passages 32 (refer to FIG. 6) formed in the bottom portion 27 of the extension-side pilot case 22 in the second embodiment, but no passage 32 is formed (no passage 32 is necessary) in the bottom portion 27 of the extension-side pilot case 222 in the third embodiment.

Further, a compression-side pilot case 252 is a component similar to the extension-side pilot case 222. Therefore, the compression-side pilot case 252 will be disclosed herein only by assigning reference numerals corresponding to FIGS. 7 to 9 thereto.

(Extension Stroke) During the extension stroke, the hydraulic fluid in the cylinder upper chamber 2A (the chamber on the upstream side) is delivered into the extension-side back-pressure chamber 25 via the upstream-side back-pressure delivery passage, i.e., the extension-side passage 19, the orifice 44 formed on the disk valve 40, the cutouts 42 formed on the piston 3, the annular passage 41 formed in the axial hole 4 of the piston 3, the pilot chamber 11 (the radial passage 39, the axial passage 14, and the radial passage 34), the width-across-flats portion 211 formed on the shaft portion 6 of the piston bolt 5, the annular passage 38 formed in the extension-side pilot case 222, and the orifice 37 (the second orifice) formed on the check valve 33. The orifice 37 does not extend to the pressure-receiving chamber 164 and therefore the extension-side back-pressure chamber 25 and the back-pressure delivery passage 161 are out of communication with each other.

Then, when the pressure in the extension-side back-pressure chamber 25 increases and reaches a predetermined pressure, the hydraulic fluid in the extension-side back-pressure chamber 25 flows into the first pressure-receiving chamber 154 via the orifice 37, the case inner peripheral passage 231, and the grooves 232 formed on the extension-side pilot case 222, and further flows to the cylinder lower chamber 2B by opening the sub valve 30. Therefore, the pressure in the extension-side back-pressure chamber 25 does not exceed the predetermined value.

On the other hand, during the extension stroke, the hydraulic fluid in the cylinder upper chamber 2A flows into the pressure-receiving chamber 184 via the downstream-side back-pressure delivery passage, i.e., the first orifice 189 formed on the second seat portion 188 (the sub valve seat portion) of the compression-side pilot case 252, the second pressure-receiving chamber 187, and the back-pressure delivery passage 181, and is further delivered into the compression-side back-pressure chamber 55 by opening the check valve 63. As a result, the compression-side main valve 53 can be prevented from being opened under the pressure in the cylinder upper chamber 2A during the extension stroke.

(Compression Stroke) During the compression stroke, the hydraulic fluid in the cylinder lower chamber 2B (the chamber on the upstream side) is delivered into the compression-side back-pressure chamber 55 via the upstream-side back-pressure delivery passage, i.e., the compression-side passage 20, the orifice 74 formed on the disk valve 70, the cutouts 72 formed on the piston 3, the annular passage 71 formed in the axial hole 4 of the piston 3, the width-across-flats portion 77 formed on the shaft portion 6 of the piston bolt 5, the annular passage 68 formed in the compression-side pilot case 252, and the orifice 67 (the second orifice) formed on the check valve 63. The orifice 67 does not extend to the pressure-receiving chamber 184 and therefore the compression-side back-pressure chamber 55 and the back-pressure delivery passage 181 are out of communication with each other.

Then, when the pressure in the compression-side back-pressure chamber 55 increases and reaches a predetermined pressure, the hydraulic fluid in the compression-side back-pressure chamber 55 flows into the first pressure-receiving chamber 174 via the orifice 67, the case inner peripheral passage 261, and a groove 262 formed on the compression-side pilot case 252, and further flows to the cylinder upper chamber 2A by opening the sub valve 60. Therefore, the pressure in the compression-side back-pressure chamber 55 does not exceed the predetermined value.

On the other hand, during the compression stroke, the hydraulic fluid in the cylinder lower chamber 2B flows into the pressure-receiving chamber 164 via the downstream-side back-pressure delivery passage, i.e., the first orifice 169 formed on the second seat portion 168 (the sub valve seat portion) of the extension-side pilot case 222, the second pressure-receiving chamber 167, and the back-pressure delivery passage 161, and is further delivered into the extension-side back-pressure chamber 25 by opening the check valve 33. As a result, the extension-side main valve 23 can be prevented from being opened under the pressure in the cylinder lower chamber 2B during the compression stroke.

According to the third embodiment, advantageous effects equivalent to the above-described first and second embodiments can be acquired.

Further, in the third embodiment, the pressure in the pilot chamber 11 is released to the cylinder lower chamber 2B (the cylinder upper chamber 2A) by opening the sub valve 30 (the sub valve 60) directly without the intervention of the back-pressure chamber 25 (the back-pressure chamber 55), and therefore the third embodiment allows the pressure in the pilot chamber 11 (64) (the compression-side pilot chamber) to be directly released to the cylinder upper chamber (2A) or the cylinder lower chamber (2B) without the intervention of the orifice 67 (37) (the second orifice) formed on the check valve 63 (33) compared to the second embodiment in which the pressure in the pilot chamber 11 is released to the cylinder lower chamber 2B (the cylinder upper chamber 2A) via the orifice 67 (37) (the second orifice) formed on the check valve 63 (33) and the back-pressure chamber 25 (the back-pressure chamber 55).

Further, in the third embodiment, the case inner peripheral passage 231 (261) is provided, and therefore the passage 32 (62) of the pilot case 22 (52) in the second embodiment does not have to be processed on the pilot case 222 (252). As a result, the third embodiment allows the productivity to be improved and thus the production cost to be reduced.

Figure 10:
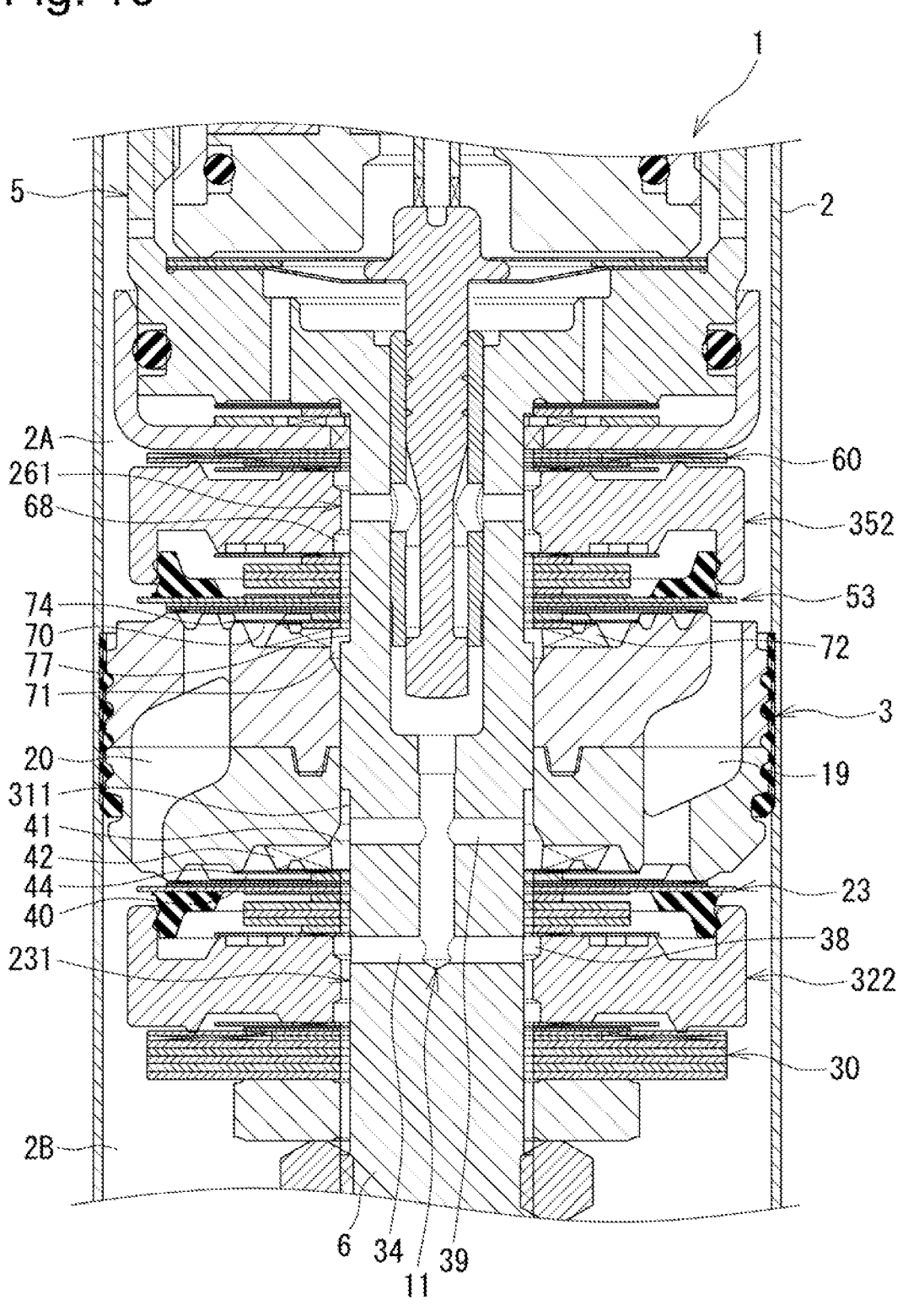
FIG. 10 is a cross-sectional view of main portions of a shock absorber according to a fourth embodiment taken along an axial plane.

(Fourth Embodiment) Next, a fourth embodiment will be described with reference to FIGS. 10 to 12.

The fourth embodiment will be described, assigning the same names and reference numerals to portions shared with the second or third embodiment, and omitting redundant descriptions thereof.

In the second and third embodiments, the first orifice 169 (189) is formed on the second seat portion 168 (188) of the pilot case 222 (252), and therefore the first pressure-receiving chamber 154 (174) is defined in a circle sector-like form by the endless first seat portion 156 (176). On the other hand, in the fourth embodiment, the first pressure-receiving chamber 154 (174) is defined annularly by the annular first seat portion 156 (176). Further, in the fourth embodiment, the first orifice 169 (189) is formed on a valve 331 (361) provided between the sub valve 30 (60) and the inner seat portion 225 (255) of a pilot case 322 (352).

Figure 11:
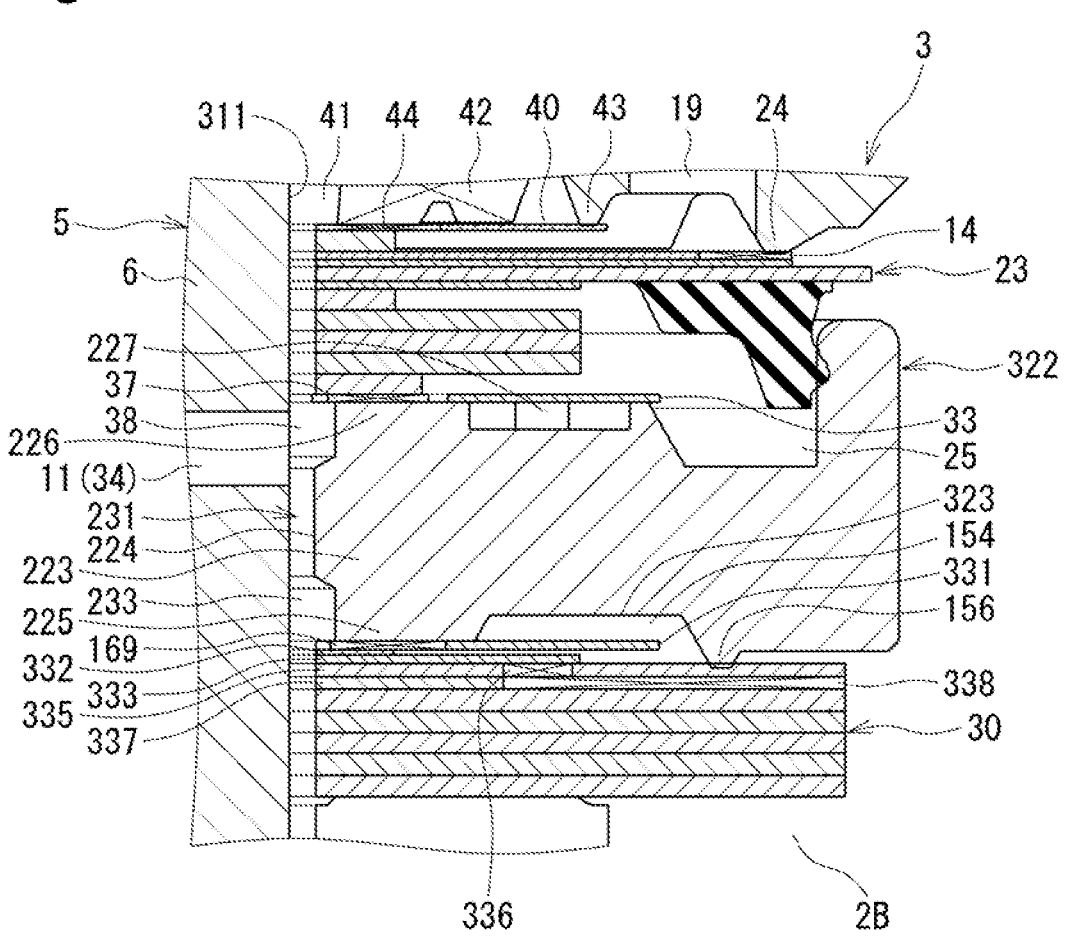
FIG. 11 is an enlarged view of an extension-side damping force variable mechanism portion illustrated in FIG. 10.

As illustrated in FIG. 11, an annular recessed portion 323 is formed between the first seat portion 156 of the extension-side pilot case 322 and the inner seat portion 225. The first seat portion 156 protrudes toward the sub valve 30 side (the "lower side" in FIG. 11) beyond the inner seat portion 225, and is separably seated on the outer peripheral edge portion of the sub valve 30. A retainer 332 and a check valve 333 are provided between the inner seat portion 225 of the extension-side pilot case 322 and the sub valve 30 in this order from the extension-side pilot case 322 side to the sub valve 30 side. A space as wide as the plate thickness of the retainer 332 in communication with the first orifice 169 is formed between a valve 331 and the check valve 333 (this space is included in the first pressure-receiving chamber 154).

An orifice 336 is provided on a disk 335 which the first seat portion 156 is in abutment with, among a plurality of disks ("seven" disks in the fourth embodiment) forming the sub valve 30, on the inner peripheral side (the "left side" in FIG. 11) thereof with respect to the portion in abutment with the first seat portion 156. On the other hand, an orifice 338 is provided on a disk 337 adjacent to (in close contact with) the disk 335, among the plurality of disks forming the sub valve 30. The orifice 338 establishes communication between the cylinder lower chamber 2B and the orifice 336. The check valve 333 is a check valve that permits a flow of the hydraulic fluid from the cylinder lower chamber 2B to the first pressure-receiving chamber 154.

Figure 12:
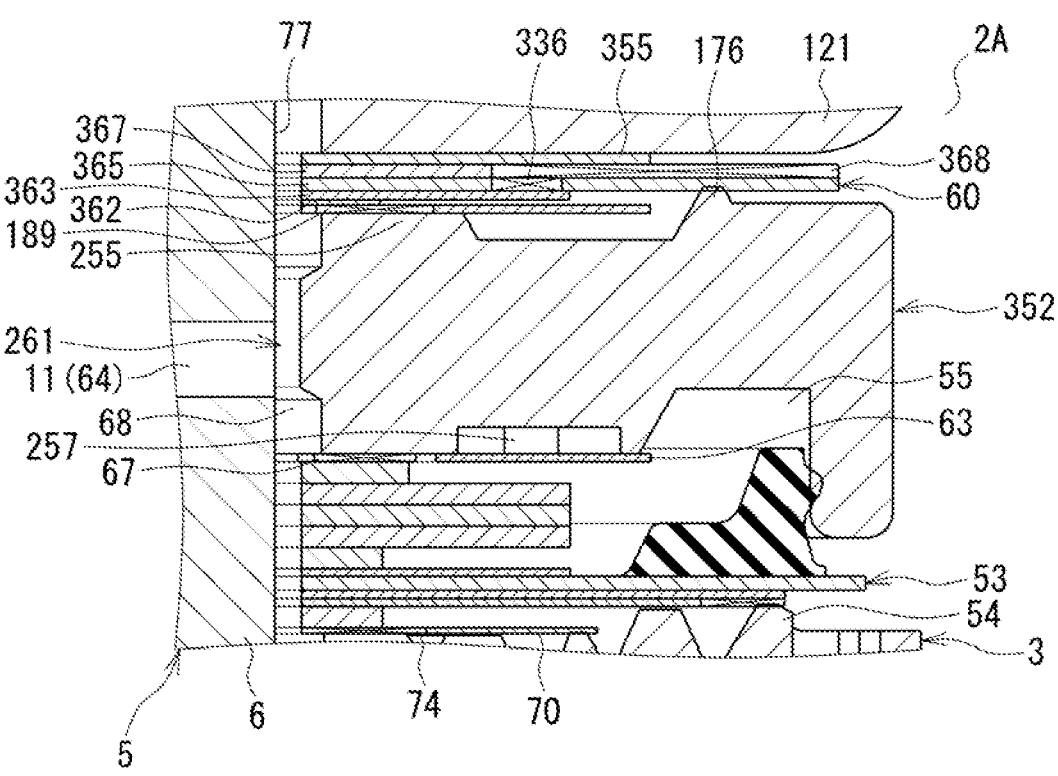
FIG. 12 is an enlarged view of a compression-side damping force variable mechanism portion illustrated in FIG. 10.

On the other hand, as illustrated in FIG. 12, an annular recessed portion 353 is formed between the first seat portion 176 of the compression-side pilot case 352 and the inner seat portion 255. The first seat portion 176 protrudes toward the sub valve 60 side (the "upper side" in FIG. 12) beyond the inner seat portion 255, and is separably seated on the outer peripheral edge portion of the sub valve 60. The valve 361, a retainer 362, and a check valve 363 are provided between the inner seat portion 255 of the compression-side pilot case 352 and the sub valve 60 in this order from the compression-side pilot case 352 side to the sub valve 60 side. A space as wide as the plate thickness of the retainer 362 in communication with the first orifice 189 is formed between the valve 361 and the check valve 363 (this space is included in the first pressure-receiving chamber 174).

An orifice 366 is provided on a disk 365 which the first seat portion 176 is in abutment with, among a plurality of disks ("two" disks in the fourth embodiment) forming the sub valve 60, on the inner peripheral side (the "left side" in FIG. 12) thereof with respect to the portion in abutment with the first seat portion 176. On the other hand, an orifice 368 is provided on a disk 367 adjacent to (in close contact with) the disk 365, among the plurality of disks forming the sub valve 60. The orifice 368 establishes communication between the cylinder upper chamber 2A and the orifice 366. The check valve 363 is a check valve that permits a flow of the hydraulic fluid from the cylinder upper chamber 2A to the first pressure-receiving chamber 174. A retainer 355 is provided between the sub valve 60 (the disk 367) and the cap 121.

(Extension Stroke) During the extension stroke, the hydraulic fluid in the cylinder upper chamber 2A (the chamber on the upstream side) is delivered into the extension-side back-pressure chamber 25 via the upstream-side back-pressure delivery passage, i.e., the extension-side passage 19, the orifice 44 formed on the disk valve 40, a width-across-flats portion 311 formed on the shaft portion 6 of the piston bolt 5, the annular passage 38 formed in the extension-side pilot case 322, and the orifice 37 (the second orifice) formed on the check valve 33. The width-across-flats portion 311 is in communication with the pilot chamber 11 (the radial passage 34 or 39).

Then, when the pressure in the extension-side back-pressure chamber 25 increases and reaches a predetermined pressure, the hydraulic fluid in the extension-side back-pressure chamber 25 flows into the first pressure-receiving chamber 154 via the orifice 37, the case inner peripheral passage 231, and the first orifice 169 formed on the valve 331, and further flows to the cylinder lower chamber 2B by opening the sub valve 30. Therefore, the pressure in the extension-side back-pressure chamber 25 does not exceed the predetermined value.

On the other hand, during the extension stroke, the hydraulic fluid in the cylinder upper chamber 2A is delivered into the compression-side back-pressure chamber 55 via the downstream-side back-pressure delivery passage, i.e., the orifice 368 and the orifice 366 formed on the sub valve 60, the first pressure-receiving chamber 174, the first orifice 189 formed on the valve 361, the width-across-flats portion 77 (a portion shared by the upstream-side back-pressure delivery passage and the downstream-side back-pressure delivery passage), and the orifice 67 formed on the check valve 63. As a result, the compression-side main valve 53 can be prevented from being opened under the pressure in the cylinder upper chamber 2A during the extension stroke.

(Compression Stroke) During the compression stroke, the hydraulic fluid in the cylinder lower chamber 2B (the chamber on the upstream side) is delivered into the compression-side back-pressure chamber 55 via the upstream-side back-pressure delivery passage, i.e., the compression-side passage 20, the orifice 74 formed on the disk valve 70, the cutouts 72 (refer to FIG. 10) formed on the piston 3, the annular passage 71 (refer to FIG. 10) formed in the axial hole 4 of the piston 3, the width-across-flats portion 77 formed on the shaft portion 6 of the piston bolt 5, the annular passage 68 formed in the compression-side pilot case 352, and the orifice 67 (the second orifice) formed on the check valve 63.

Then, when the pressure in the compression-side back-pressure chamber 55 increases and reaches a predetermined pressure, the hydraulic fluid in the compression-side back-pressure chamber 55 flows into the first pressure-receiving chamber 174 via the orifice 67, the case inner peripheral passage 261, and the first orifice 189 formed on the valve 361, and further flows to the cylinder upper chamber 2A by opening the sub valve 60. Therefore, the pressure in the compression-side back-pressure chamber 55 does not exceed the predetermined value.

On the other hand, during the compression stroke, the hydraulic fluid in the cylinder lower chamber 2B is delivered into the extension-side back-pressure chamber 25 via the downstream-side back-pressure delivery passage, i.e., the orifice 338 and the orifice 336 formed on the sub valve 30, the first pressure-receiving chamber 154, the first orifice 169 formed on the valve 331, the width-across-flats portion 311 (the portion shared by the upstream-side back-pressure delivery passage and the downstream-side back-pressure delivery passage), and the orifice 37 formed on the check valve 33. As a result, the extension-side main valve 23 can be prevented from being opened under the pressure in the cylinder lower chamber 2B during the compression stroke.

According to the fourth embodiment, advantageous effects equivalent to the above-described first to third embodiments can be acquired.

Further, in the fourth embodiment, the downstream-side back-pressure delivery passage is constituted by the orifice 338 (368) and the orifice 336 (366) formed on the sub valve 30 (60), the width-across-flats portion 311 formed on the shaft portion 6 of the piston bolt 5, and the orifice 37 (67), and therefore the back-pressure delivery passage 161 (181) in the third embodiment does not have to be processed on the pilot case 322 (352). Therefore, the productivity of the shock absorber 1 can be further improved.

Figure 13:
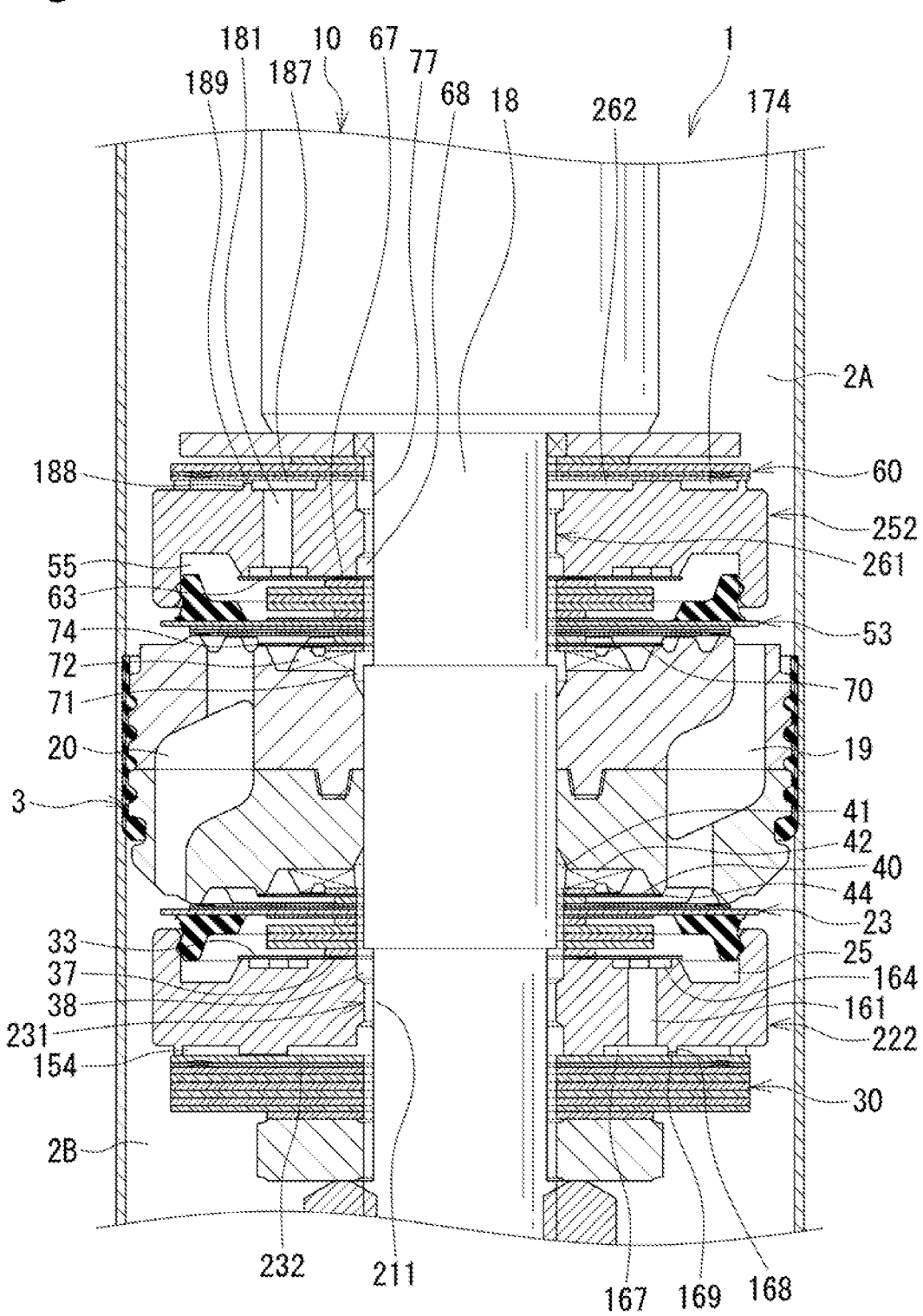
FIG. 13 is a cross-sectional view of main portions of a shock absorber according to a fifth embodiment taken along an axial plane.

(Fifth Embodiment) Next, a fifth embodiment will be described with reference to FIG. 13.

The fifth embodiment will be described, assigning the same names and reference numerals to portions shared with the first or third embodiment, and omitting redundant descriptions thereof.

In the fifth embodiment, the pilot case 222 (252) according to the third embodiment is applied to the conventional-type shock absorber 1 (refer to FIG. 1) not including the damping force variable mechanism using the actuator (the solenoid 91, refer to FIG. 4). In the fifth embodiment, the pilot case 222 (252) is attached to the small-diameter portion 18 of the piston rod 10. Further, the width-across-flats portion 211 (77), which constitutes a part of the upstream-side back-pressure delivery passage, is formed on the small-diameter portion 18 of the piston rod 10.

(Extension Stroke) During the extension stroke, the hydraulic fluid in the cylinder upper chamber 2A (the chamber on the upstream side) is delivered into the extension-side back-pressure chamber 25 via the upstream-side back-pressure delivery passage, i.e., the extension-side passage 19, the orifice 44 formed on the disk valve 40, the cutouts 42 formed on the piston 3, the annular passage 41 formed in the axial hole 4 of the piston 3, the width-across-flats portion 211 formed on the small-diameter portion 18 of the piston rod 10, the annular passage 38 formed in the extension-side pilot case 222, and the orifice 37 (the second orifice) formed on the check valve 33.

Then, when the pressure in the extension-side back-pressure chamber 25 increases and reaches a predetermined pressure, the hydraulic fluid in the extension-side back-pressure chamber 25 flows into the first pressure-receiving chamber 154 via the orifice 37, the case inner peripheral passage 231, and the grooves 232 formed on the extension-side pilot case 222, and further flows to the cylinder lower chamber 2B by opening the sub valve 30. Therefore, the pressure in the extension-side back-pressure chamber 25 does not exceed the predetermined value.

On the other hand, during the extension stroke, the hydraulic fluid in the cylinder upper chamber 2A flows into the pressure-receiving chamber 184 via the downstream-side back-pressure delivery passage, i.e., the first orifice 189 formed on the second seat portion 188 (the sub valve seat portion) of the compression-side pilot case 252, the second pressure-receiving chamber 187, and the back-pressure delivery passage 181, and is further delivered into the compression-side back-pressure chamber 55 by opening the check valve 63. As a result, the compression-side main valve 53 can be prevented from being opened under the pressure in the cylinder upper chamber 2A during the extension stroke.

(Compression Stroke) During the compression stroke, the hydraulic fluid in the cylinder lower chamber 2B (the chamber on the upstream side) is delivered into the compression-side back-pressure chamber 55 via the upstream-side back-pressure delivery passage, i.e., the compression-side passage 20, the orifice 74 formed on the disk valve 70, the cutouts 72 formed on the piston 3, the annular passage 71 formed in the axial hole 4 of the piston 3, the width-across-flats portion 77 formed on the small-diameter portion 18 of the piston rod 10, the annular passage 68 formed in the compression-side pilot case 252, and the orifice 67 (the second orifice) formed on the check valve 63.

Then, when the pressure in the compression-side back-pressure chamber 55 increases and reaches a predetermined pressure, the hydraulic fluid in the compression-side back-pressure chamber 55 flows into the first pressure-receiving chamber 174 via the orifice 67, the case inner peripheral passage 261, and the groove 262 formed on the compression-side pilot case 252, and further flows to the cylinder lower chamber 2B by opening the sub valve 60. Therefore, the pressure in the compression-side back-pressure chamber 55 does not exceed the predetermined value.

On the other hand, during the compression stroke, the hydraulic fluid in the cylinder lower chamber 2B flows into the pressure-receiving chamber 164 via the downstream-side back-pressure delivery passage, i.e., the first orifice 169 formed on the second seat portion 168 (the sub valve seat portion) of the extension-side pilot case 222, the second pressure-receiving chamber 167, and the back-pressure delivery passage 161, and is further delivered into the extension-side back-pressure chamber 25 by opening the check valve 33. As a result, the extension-side main valve 23 can be prevented from being opened under the pressure in the cylinder lower chamber 2B during the compression stroke.

According to the fifth embodiment, advantageous effects equivalent to the above-described first to third embodiments can be acquired.

Figure 14:
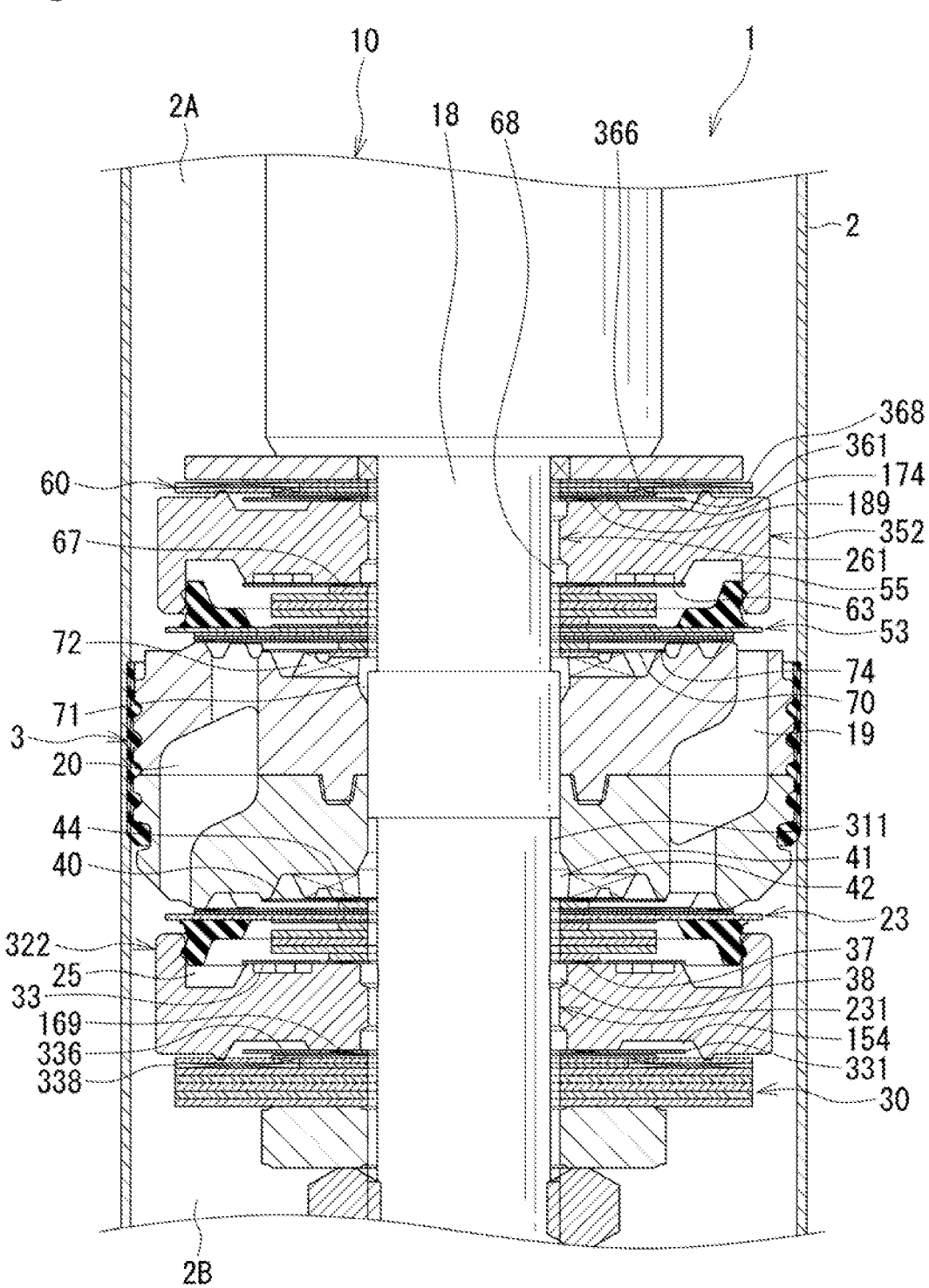
FIG. 14 is a cross-sectional view of main portions of a shock absorber according to a sixth embodiment taken along an axial plane.

(Sixth Embodiment) Next, a sixth embodiment will be described with reference to FIG. 14.

The sixth embodiment will be described, assigning the same names and reference numerals to portions shared with the first or fourth embodiment, and omitting redundant descriptions thereof.

In the sixth embodiment, the pilot case 322 (352) according to the fourth embodiment is applied to the conventional-type shock absorber 1 (refer to FIG. 1) not including the damping force variable mechanism using the actuator (the solenoid 91, refer to FIG. 4). In the sixth embodiment, the pilot case 322 (352) is attached to the small-diameter portion 18 of the piston rod 10. Further, the width-across-flats portion 311 (77), which constitutes a part of the upstream-side back-pressure delivery passage, is formed on the small-diameter portion 18 of the piston rod 10.

(Extension Stroke) During the extension stroke, the hydraulic fluid in the cylinder upper chamber 2A (the chamber on the upstream side) is delivered into the extension-side back-pressure chamber 25 via the upstream-side back-pressure delivery passage, i.e., the extension-side passage 19, the orifice 44 formed on the disk valve 40, the width-across-flats portion 311 formed on the small-diameter portion 18 of the piston rod 10, the annular passage 38 formed in the extension-side pilot case 322, and the orifice 37 (the second orifice) formed on the check valve 33.

Then, when the pressure in the extension-side back-pressure chamber 25 increases and reaches a predetermined pressure, the hydraulic fluid in the extension-side back-pressure chamber 25 flows into the first pressure-receiving chamber 154 via the orifice 37, the case inner peripheral passage 231, and the first orifice 169 formed on the valve 331, and further flows to the cylinder lower chamber 2B by opening the sub valve 30. Therefore, the pressure in the extension-side back-pressure chamber 25 does not exceed the predetermined value.

On the other hand, during the extension stroke, the hydraulic fluid in the cylinder upper chamber 2A is delivered into the compression-side back-pressure chamber 55 via the downstream-side back-pressure delivery passage, i.e., the orifice 368 and the orifice 366 formed on the sub valve 60, the first pressure-receiving chamber 174, the first orifice 189 formed on the valve 361, the width-across-flats portion 77 (the portion shared by the upstream-side back-pressure delivery passage and the downstream-side back-pressure delivery passage), and the orifice 67 formed on the check valve 63. As a result, the compression-side main valve 53 can be prevented from being opened under the pressure in the cylinder upper chamber 2A during the extension stroke.

(Compression Stroke) During the compression stroke, the hydraulic fluid in the cylinder lower chamber 2B (the chamber on the upstream side) is delivered into the compression-side back-pressure chamber 55 via the upstream-side back-pressure delivery passage, i.e., the compression-side passage 20, the orifice 74 formed on the disk valve 70, the cutouts 72 formed on the piston 3, the annular passage 71 formed in the axial hole 4 of the piston 3, the width-across-flats portion 77 formed on the small-diameter portion 18 of the piston rod 10, the annular passage 68 formed in the compression-side pilot case 352, and the orifice 67 (the second orifice) formed on the check valve 63.

Then, when the pressure in the compression-side back-pressure chamber 55 increases and reaches a predetermined pressure, the hydraulic fluid in the compression-side back-pressure chamber 55 flows into the first pressure-receiving chamber 174 via the orifice 67, the case inner peripheral passage 261, and the first orifice 189 formed on the valve 361, and further flows to the cylinder upper chamber 2A by opening the sub valve 60. Therefore, the pressure in the compression-side back-pressure chamber 55 does not exceed the predetermined value.

On the other hand, during the compression stroke, the hydraulic fluid in the cylinder lower chamber 2B is delivered into the extension-side back-pressure chamber 25 via the downstream-side back-pressure delivery passage, i.e., the orifice 338 and the orifice 336 formed on the sub valve 30, the first pressure-receiving chamber 154, the first orifice 169 formed on the valve 331, the width-across-flats portion 311 (the portion shared by the upstream-side back-pressure delivery passage and the downstream-side back-pressure delivery passage), and the orifice 37 formed on the check valve 33. As a result, the extension-side main valve 23 can be prevented from being opened under the pressure in the cylinder lower chamber 2B during the compression stroke.

According to the sixth embodiment, advantageous effects equivalent to the above-described first to fifth embodiments can be acquired.

REFERENCE SIGNS LIST 1 shock absorber
2 cylinder
2A cylinder upper chamber
2B cylinder lower chamber
3 piston
10 piston rod
19 extension-side passage
20 compression-side passage
22 extension-side pilot case (case member)
23 extension-side main valve
25 extension-side back-pressure chamber
26 cylindrical portion (tubular portion)
27 bottom portion
28 opening portion
30 sub valve
33 check valve
35 seat portion
52 compression-side pilot case (case member)
53 compression-side main valve
55 compression-side back-pressure chamber
56 cylindrical portion (tubular portion)
57 bottom portion
58 opening portion
60 sub valve
63 check valve
65 seat portion
153 orifice (second orifice)

161 back-pressure delivery passage (downstream-side back-pressure delivery passage)

164 pressure-receiving chamber

169 first orifice

173 orifice (second orifice)

181 back-pressure delivery passage (downstream-side back-pressure delivery passage)

184 pressure-receiving chamber

189 first orifice

The invention claimed is:

1. A shock absorber comprising:

a cylinder sealingly containing hydraulic fluid therein;

a piston slidably inserted in the cylinder and partitioning an inside of the cylinder into two chambers;

a piston rod coupled with the piston and extending out of the cylinder;

a passage in which a flow of the hydraulic fluid is generated due to a movement of the piston rod in one direction;

a main valve configured to apply a resistance force to a flow of the hydraulic fluid in the passage that is directed from a chamber on an upstream side to a chamber on a downstream side;

a back-pressure chamber configured to apply an inner pressure in a valve-closing direction of the main valve;

a bottomed cylindrical case member including a tubular portion and a bottom portion, the tubular portion having an opening portion on one end thereof, the main valve being disposed on the opening portion, the back-pressure chamber being formed inside the case member;

a first seat portion formed on the bottom portion of the case member, the first seat portion defining a first pressure-receiving chamber in communication with the back-pressure chamber;

a downstream-side back-pressure delivery passage formed in the bottom portion of the case member, the downstream-side back-pressure delivery passage being configured in such a manner that the hydraulic fluid is delivered from a chamber switched to the upstream side according to a movement of the piston in an opposite direction to the back-pressure chamber, the downstream-side back-pressure delivery passage being isolated from the first pressure-receiving chamber;

a second seat portion formed on the bottom portion of the case member and surrounding an opening of the downstream-side back-pressure delivery passage;

a sub valve configured to be seated on the first seat portion and the second seat portion, the sub valve being configured to be opened under a pressure in the back-pressure chamber and apply a resistance force to a flow of the hydraulic fluid from the back-pressure chamber to the chamber on the downstream side;

a first orifice formed on the second seat portion; and a second orifice provided in a communication passage that establishes communication between the back-pressure chamber and a chamber switched to the downstream side according to the movement of the piston in the opposite direction, the second orifice having a flow passage area larger than the first orifice.

2. The shock absorber according to claim 1, wherein an upstream-side back-pressure delivery passage is formed in the piston rod.

3. The shock absorber according to claim 1, wherein the downstream-side back-pressure delivery passage is formed on a sub valve seat portion on which the sub valve is seated.

4. The shock absorber according to claim 3, wherein the upstream-side back-pressure delivery passage and the downstream-side back-pressure delivery passage have a common portion therebetween.

5. The shock absorber according to claim 2, wherein the downstream-side back-pressure delivery passage is formed on a sub valve seat portion on which the sub valve is seated.

6. The shock absorber according to claim 5, wherein the upstream-side back-pressure delivery passage and the downstream-side back-pressure delivery passage have a common portion therebetween.

* * * * *